United States Patent [19]

Sant'Anselmo et al.

[11] Patent Number: 4,924,078
[45] Date of Patent: May 8, 1990

[54] IDENTIFICATION SYMBOL, SYSTEM AND METHOD

[76] Inventors: Carl Sant'Anselmo, 5249 Valley View Rd., Rancho Palos Verdes, Calif. 90274; Robert Sant'Anselmo, 7912 Bobbyboyer Ave., Canoga Park, Calif. 91304; David C. Hooper, 693 Lantana St., Apt. 74, Camarillo, Calif. 93010

[21] Appl. No.: 125,616

[22] Filed: Nov. 25, 1987

[51] Int. Cl.$^5$ .................. G06K 7/14; G06K 19/06
[52] U.S. Cl. ................................. 235/494; 235/487
[58] Field of Search .............. 235/494, 487, 460, 461, 235/462, 463, 466

[56] References Cited

U.S. PATENT DOCUMENTS

| | | |
|---|---|---|
| 2,612,994 | 10/1952 | Woodland . |
| 3,309,668 | 3/1967 | Feissel et al. . |
| 3,409,760 | 11/1968 | Hamisch . |
| 3,474,230 | 10/1969 | McMillen . |
| 3,492,660 | 1/1970 | Halverson . |
| 3,529,133 | 9/1970 | Kent et al. . |
| 3,543,007 | 11/1970 | Brinker . |
| 3,643,068 | 2/1972 | Mohan et al. . |
| 3,774,758 | 11/1973 | Sternberg . |
| 3,792,236 | 2/1974 | Dobras et al. . |
| 3,811,033 | 5/1974 | Herrin et al. . |
| 3,894,756 | 7/1975 | Ward . |
| 4,034,210 | 7/1977 | Hill et al. . |
| 4,163,570 | 8/1979 | Greenaway . |
| 4,180,284 | 12/1979 | Ashley . |
| 4,211,918 | 7/1980 | Nyfeler et al. . |
| 4,239,261 | 12/1980 | Richardson . |
| 4,489,318 | 12/1984 | Goldman . |
| 4,614,366 | 9/1986 | North et al. . |

OTHER PUBLICATIONS

Dennis G. Priddy, "Datacode", Product Description Brochure, Datacode International, Inc., Safety Harbor, Fla., Jun. 1989.
Veritec Inc., pp. 76 and 77, Public Gaming Magazine, George Haroney, Graphing Quadric Surfaces, Dec. 1986, pp. 215–224.
"How Japanese Square Route Could Cut the Cost of Coding", by Roy Garner, May. 5, 1987, Colin Linn, Financial Times.

Primary Examiner—A. D. Pellinen
Assistant Examiner—Leon K. Fuller
Attorney, Agent, or Firm—Staas & Halsey

[57] ABSTRACT

The present invention is a symbol 10 that includes a square array 12 of data cells 14 surrounded by a border 30 of orientation and timing data cells. The border 30 can be surrounded by an external data field 18 also including information data cells 20. The orientation and timing for sampling each data cell can be determined from the border 30 or from additional orientation and timing cells in the internal data field 12 or external data field 18. A system 40 and 42 is also included that captures an image of the symbol, determines symbol orientation, decodes the contents of the symbol and outputs the decoded contents to a display or other device. The present invention also includes a device 48 that can produce symbols on a substrate such as a label.

20 Claims, 11 Drawing Sheets

CENTER LINE

DEPTH-OF-FIELD

IDENTIFICATION SYMBOL, SYSTEM AND METHOD

CROSS-REFERENCES TO RELATED APPLICATIONS

This application is related to U.S. application Ser. No. 306,212 the continuation of; Ser. No. 013,026, filed Feb. 10, 1987, entitled Authenticating Pseudo-Random Code now abandoned and Apparatus by Carl Sant' Anselmo and U.S. application Ser. No. 124,274 entitled Symbol Reader by James L. Karney filed Nov. 23, 1987, both incorporated by reference herein.

BACKGROUND OF THE INVENTION

1. Field of the Invention

This application is directed to an identification symbol which can be used on items to be identified and, more particularly, to a symbol that includes an orientation border and a method for recognizing and decoding the information represented by the symbol.

2. Description of the Related Art

Conventional identification symbols include circular or polar symbols and bar code symbols. Bar code symbols consist of various width bars arranged in a linear orientation. To determine the meaning of a bar code symbol, the symbol must be scanned in a direction substantially parallel with the linear arrangement of the bars. That is, the bar code symbols have a preferred scanning direction and the scanning device must be positioned to scan in the preferred direction. Because the symbol must be properly oriented for scanning, the symbol must be pre-oriented by the symbol identification system user or the scanning apparatus must be capable of scanning in many different directions. Many bar code scanning systems for bar codes on packages and other objects require a quiet zone (a zone of no data lines) in front of the bar code and behind the bar code in the preferred scanning direction. The quiet zone is designed to define an area in which no printing on the package is allowed because printing within the quite zone will render the bar code unreadable. The exterior of the quiet zone constitutes a printing boundary and, on some packages, is defined by a line that can run all the way around the bar code. This line carries or imprints no timing or orientation information and is merely used to define the printing boundary of the symbol. The boundary line is not part of the symbol. The circular identification symbols also suffer from the scanning orientation problem and must be scanned in one direction although the symbol can be in any orientation. Because of the need to scan the conventional symbols in a preferred direction and because many items that include such symbols are randomly oriented when they arrive at a symbol reader, a need has arisen for a symbol that contains high data density and which can be oriented in any direction and still be cost effectively machine readable.

SUMMARY OF THE INVENTION

It is an object of the present invention to provide a symbol that can be detected in any orientation without reorientation of the image data.

It is another object of the present invention to provide a symbol that does not require a preferred direction of scanning.

It is an additional object of the present invention to provide a symbol that increases information density.

The above objects can be accomplished by a symbol that includes a rectilinear array of data cells surrounded by other data cells forming one or more orientation borders. A system is also included that captures an image of the symbol, determines symbol orientation, decodes the contents of the symbol and outputs the decoded contents to a display or other device.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
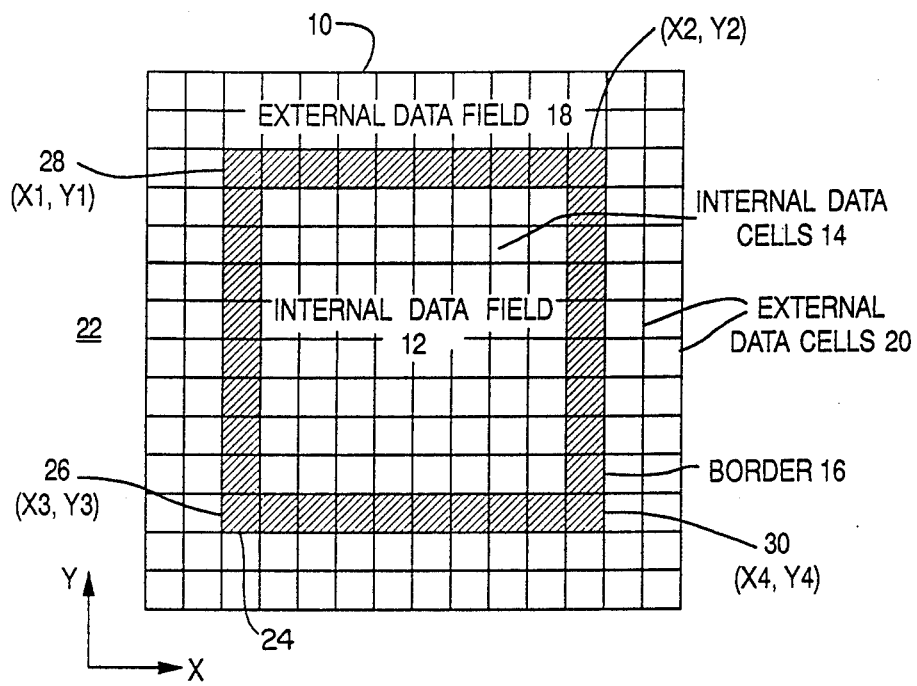
FIG. 1 illustrates a symbol 10 in accordance with the present invention.

A symbol 10 in accordance with the present invention includes a rectilinear data field 12 with internal data cells 14 arranged in a matrix, as illustrated in FIG. 1. A matrix 14 of 7×7 data cells using one cell as a parity bit will allow $2^{48}$ different symbols 10. The symbol 10 of FIG. 1 has an internal data field of 64 bits and an external data field of 96 bits allowing $2^{95}$ different symbols. The symbol 10, as can be seen, can have internal and external data fields of a size (N/X/N) which is flexible enough to accommodate any desired number of different and unique symbols. The internal data field 12 is surrounded by a an orientation and/or timing data cell border 16 which is used for timing and symbol orientation. The border is typically formed from "on" data cells where an "on" cell can be a light reflecting or light absorbing spot depending on the application. Surrounding the border 16 can be an external data field 18 that includes external data cells 20 which provide addition information on orientation, timing or symbol identification. Surrounding the border 16 or the external data field 18 is a quite zone equivalent to one or more concentric rectilinear rings of "off" data cells surrounding the outermost pattern of "on" cells. The required number of concentric rectilinear rings of the quite zone is effected by the environmental factors of symbol usage. The external data field 18 can act as a quiet zone or can be surrounded by a further quiet zone. Is it possible for the symbol 10 to be as small as is optically readable and as large as desired. The symbol 10 is formed on a substrate such as a sticker or label. The symbol can also be etched, engraved in an object or imaged in a film substrate.

The rectangular border 16 of the symbol can provide useful information which is independent of the information in the symbol itself. The border can be used to calculate the size or equivalently the timing sequence for sampling the data cells, if the number of cells per side of the symbol are known in accordance with the following equations:

$$HCL = (X2 - X1)/NHC \tag{1}$$

$$HC = (X2 - X1)/HR * NHC \tag{2}$$

$$VCL = (Y3 - Y1)/NVC \tag{3}$$

$$VC = (Y3 - Y1)/VR * NVC \tag{4}$$

where HCL is horizontal cell length, HC is horizontal correction factor, VCL is vertical cell length; VC is vertical correction factor; X1, Y1 are the coordinates of the lowest X value 24; X2, Y2 are the coordinates of the lowest Y value 26; X3, Y3 equals the coordinates of the highest Y value; X4, Y4 equals the coordinates of the highest X value 30; NHC equals the number of horizontal cells; HR is the horizontal remainder; NVC is the number of vertical cells and VR is the vertical remainder. If the number of data cells per side is not known, the width or thickness of the border 10 can be determined by counting image pixels. If the width of the border 16 in data cells is known, the size of each data cell can be determined by dividing the pixel width by the data cell width. Once the data cell size is known, the data cells can be properly sampled using the border 16 as a timing or sample separation reference.

The orientation of the symbol 10 with respect to a reference system can be determined using known graphics techniques when the location of three corners are known. Knowing the orientation of the symbol 10 provides the orientation of the object to which the symbol 10 is attached. Alternately, using standard slope formulas, the border 16 can provide information defining the rotation or orientation of a symbol 10 in a plane parallel to the image capture plane using the following equation:

$$S12 = (Y2 - Y1)/(X2 - X1) \tag{5}$$

, where S12 is the slope relative to a reference axis. The value of S12 can be verified using the following equations:

$$S13 = (Y3 - Y1)/(X3 - X1) \tag{6}$$

$$S12 = 1/S13 \tag{7}$$

where S23 is the slope of a border line perpendicular to S12.

Figure 3:
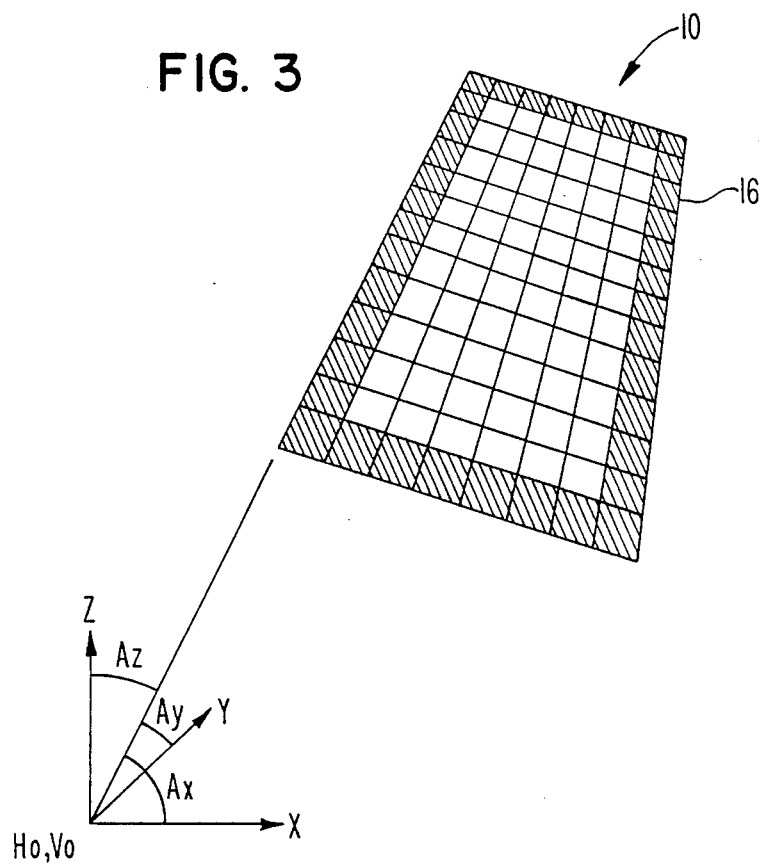
FIG. 3 illustrates a symbol 10 with three-dimensional yaw, pitch and roll orientation.

Because of the rectangular nature of the symbol border 16, well known rotational decomposition algorithms common in the graphics industry can also be used to determine the three-dimensional orientation of the symbol, as illustrated in FIG. 3, where the angles Ax, Ay and Az define the three-dimensional orientation (yaw, pitch and roll) of the symbol 10. With the origin defined by horizontal coordinates $H_o$, $V_o$ the three dimensional orientation of each portion of the symbol can be defined by the angle it forms with respect to reference axes in accordance with the following equations:

$$H = X \cos Ax + y \cos Ay + z \cos Az + Ho \tag{8}$$

$$V = X \sin Ax + Y \sin Ay + z \sin Az = Vo \tag{9}$$

Using these formulas along with the slope formulas previously discussed it is possible to determine the location of any data cell in the image. Additional information concerning rotational decomposition can be found in "Graphing Quadric Surfaces" by G. Haroney, Byte Magazine, Dec. 1986, page 217 and "3D Graphics Applications of IATX 86/20," Intel Application Note, Intel Solutions Magazine, July/Aug 1982 incorporated by reference herein. The symbol illustrated in FIG. 3 must be of a known size to allow the known triangulation algorithms to properly operate.

When a symbol 10 of a known size is imaged, the distance to the symbol 10 can also be determined by comparing the width of the largest border 16 with the width or length of a reference border or the largest data cell with a reference data cell. The size ratio along with the known optical dimensions of lenses, etc. in the imaging system can be used in standard optical geometry algorithms to determine the symbol distance.

Figure 4:
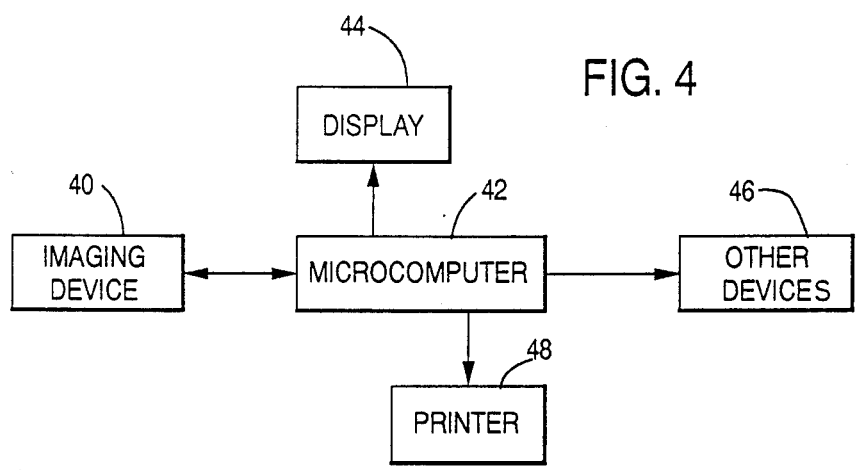
FIG. 4 illustrates the components of a system capable of capturing and decoding a symbol 10 or printing encoded symbols in accordance with the present invention.

FIG. 4 illustrates the components of a system capable of detecting and decoding the symbols 10 of the present invention as well as producing symbols on an appropriate substrate such as adhesive labels. An image capture device 40 is used to capture the symbol image and provide it preferably to a microcomputer 42 such as an IBM AT, another suitable computer or a single chip microcomputer which finds the symbol 10 in the image and decodes it. The microcomputer 42 can output the decoded identification to a display device 44 or to other devices 46 such as a robot control system or an inventory tracking system. The microcomputer 42 can also be used to produce unique encoded symbols as described in U.S. application Ser. No. 013,026 and print those symbols using a printer 48 such as a laser jet printer using a standard graphics package or software available from Cauzin Systems Incorporated of Waterbury, Conn. For example, each unique product code for items in an inventory can be converted into a bit stream of 47 bits. A party bit is then added to provide a symbol self check feature. Assuming that all data and orientation cell sizes are known, for each bit with a "one" value a data cell can be created in a symbol image in the computer memory. Each byte in the computer memory can represent one pixel at the resolution of the printer and a group of pixels can be defined as a single data cell. The bit values can be used to set all the pixels in the data cell to the same value on the grey scale of a laser jet printer. The computer reads out the contents of the image memory and sends it to the printer which would print each symbol on a different adhesive label, drive a laser etcher creating a symbol in a metal substrate or drive an ink jet printer to fill in appropriate data cells.

The imaging capture 40 can be a two-dimensional symbol reader as described in the Karney application previously mentioned. The image capture device 40 can also be a standard video camera or any other imaging device with sufficient resolution to discern the individual data cells in the symbol 10. The microcomputer 42 in most cases will be capturing and decoding the symbol 10 in real-time. It is preferred that the device 40 provide the image in a two-dimensional form with each pixel of the image represented by a bit in an appropriately sized memory. If an image capture device using a video camera is used an appropriate camera is an NEC TI50-ES available from NEC and a suitable frame grabber interface is DT-2803 available from Data Translation. If a line scan image capture device is used, the line image would have to be assembled in the memory of the computer before symbol recognition processing starts.

Figure 5:
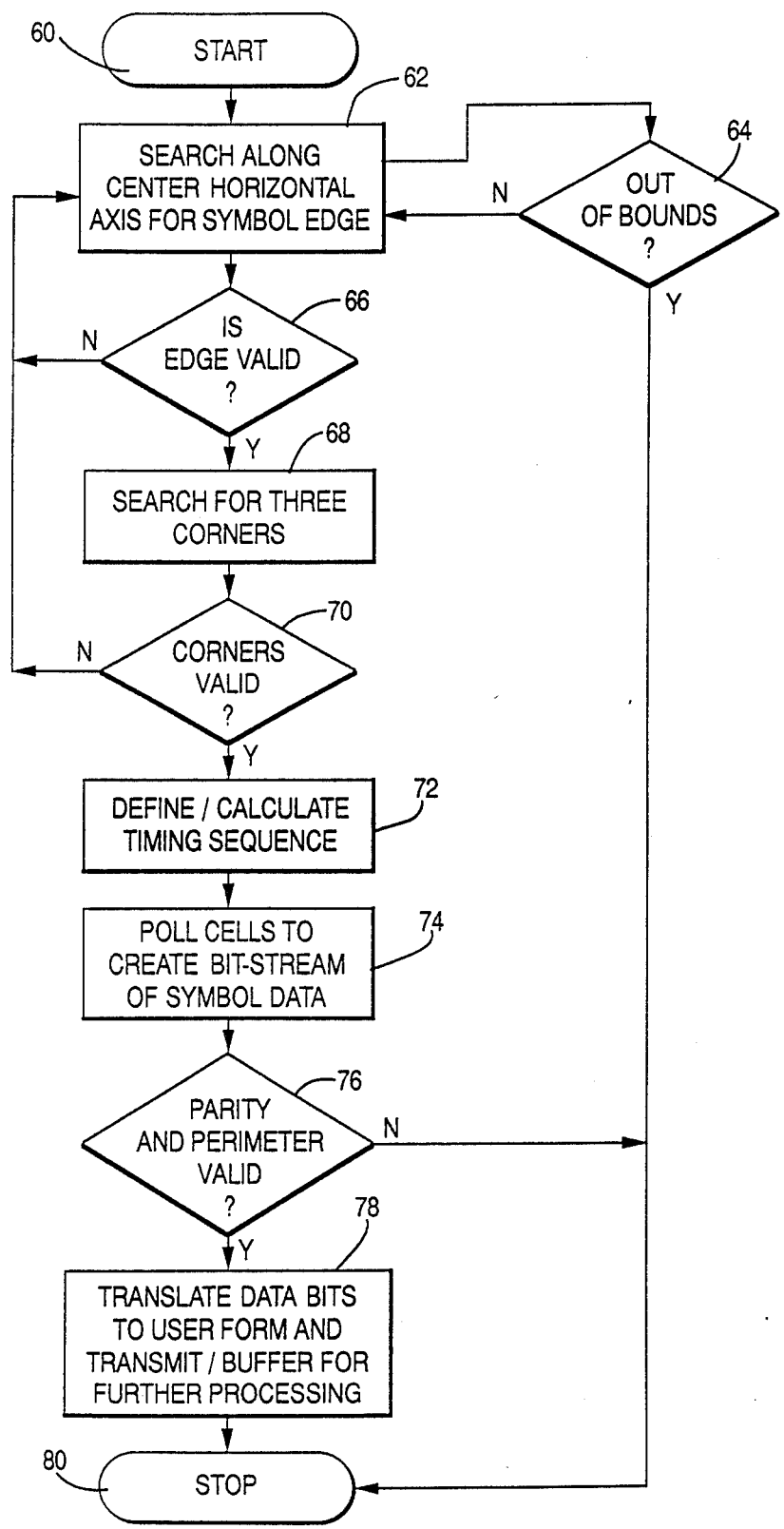
FIG. 5 is a flowchart of the processing performed to decode a symbol in accordance with the present invention.

The data provided by the interface can be enhanced and have noise removed by standard image processing techniques such as a three-by-three bit convolution, or other convolution methods such as the La Placian, Sobel, Prewit and high-pass/low-pass filtering techniques. When the image plane and the symbol plane are in parallel and, as a result, the image captured is two-dimensional, a decoding algorithm as illustrated in FIG. 5 will determine the location of the edges and corners, and output the data represented by the symbol. First the image is searched 62 along a center horizontal axis for a symbol edge. If an edge is not found 64 the process stops. If a valid edge is found 66, the process searches 68 for the three corners of the symbol until valid corners are found 70. Once the corners are located, the timing sequence for sampling the value of each data cell can be determined 72. Once the timing sequence is defined the data cells are polled 74 to create the symbol bit stream which is checked for parity 76 and output or translated 78 into a desired format symbol identification code. Source code which performs the above discussed operations based on an image produced by the camera and frame grabber previously discussed is attached as an Appendix. Other more sophisticated image recognition techniques can also be used to determine the symbol identification directly from the captured image.

Figure 6:
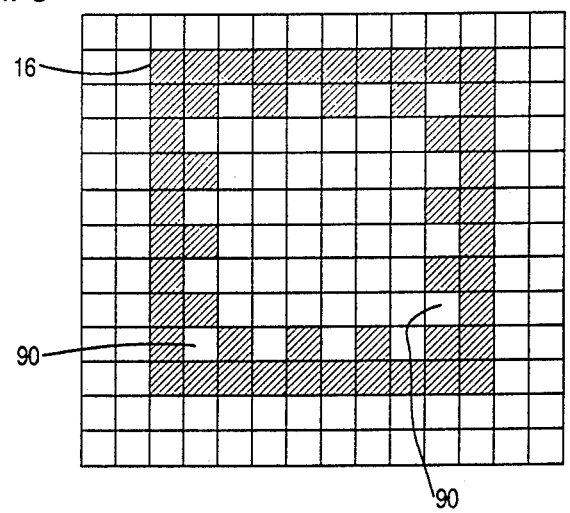
FIGS. 6-10H illustrate additional timing data cells provided by a symbol 10.
Figure 7:
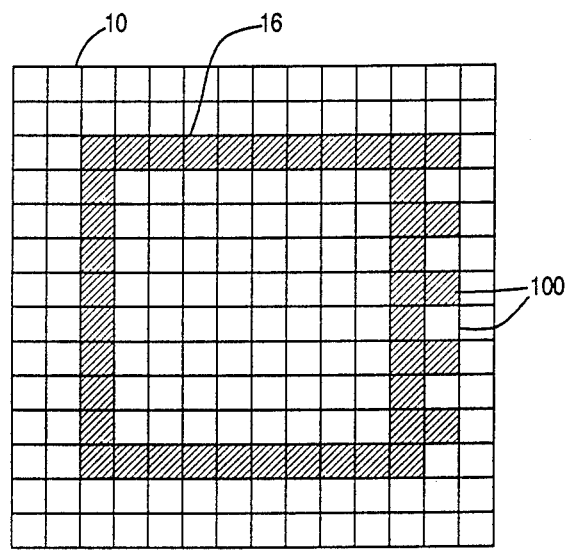

For symbol processing in which the timing used to poll the data cell areas is not part of the internal data structure and is calculated from the corner coordinates and/or from the number of cells per side or width, a symbol as illustrated in FIG. 1 is used. For symbol processing in which essential timing information is not known prior to processing or in which the image is captured in such a way as to be asymmetrical, as depicted in FIG. 3, a symbol as illustrated in FIG. 6 is preferably used, in which the border 16 includes an outermost definition border of all on cells combined with an internal timing data cell border of alternating ON and OFF timing cells 90. The timing sequence for sampling the internal data field cell contents is provided by the reference cells 90 no matter the orientation of the symbol 10. FIG. 7 illustrates a symbol 10 with timing data cells 100 external to the border 16. Timing cells of this type can also be used as additional orientation data cells to help determine the three-dimensional orientation of the symbol.

Figure 8:
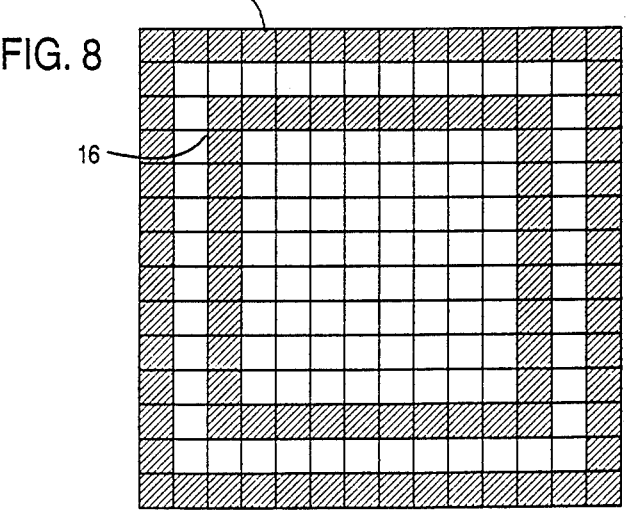

In image capture situations in which there are multiple rectangular shapes within the region of interest a border of several concentric rectilinear data cell rings can be provided as illustrated in FIG. 8. This symbol 10 includes an inner border 16 and an outer border 92 and has numerous applications such as it can be used to provide not only the timing sequence for data cell sampling but can supply additional confirmation of symbol orientation or represent other specific information.

Figure 9:
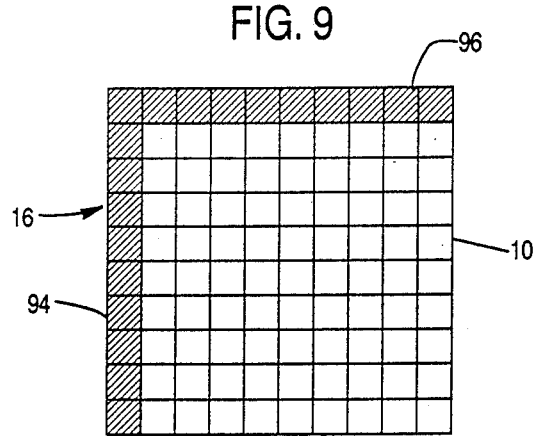

In an environment in which the symbol is strictly aligned with the image plane of the imaging device 40, a symbol as illustrated in FIG. 9 can be provided. This symbol 10 provides a single border 16 on two sides 94 and 96 nearest to the scanning direction and which provides timing information. A key to all the border patterns discussed in this application is that the outermost border 16, not including the quiet zone, be smooth and on at least two sides of the data area. This type of border 16 leads to the fastest image processing of the pixel data in an environment where the exact location of a symbol 10 is not known because the number of edges to be located is at a minimum and the edges are contiguous. In an environment where the exact location of the symbol is known in advance along with the symbol size and data density, the border can be completely eliminated which will produce the fastest possible symbol decoding environment.

Figure 10A:
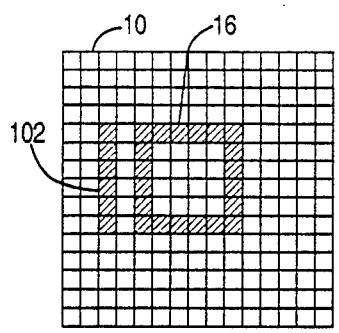
Figure 10B:
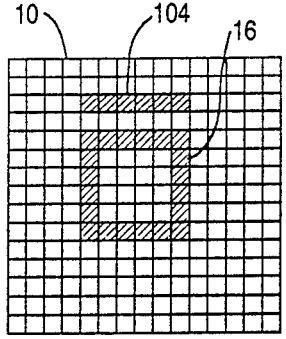
Figure 10C:
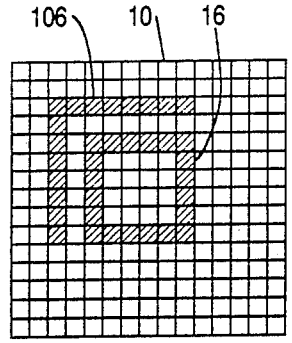
Figure 10D:
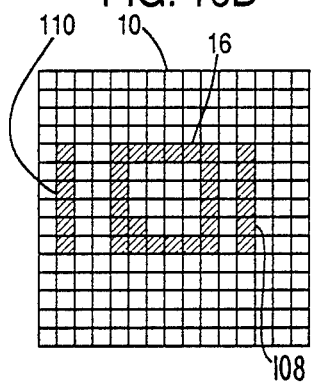
Figure 10E:
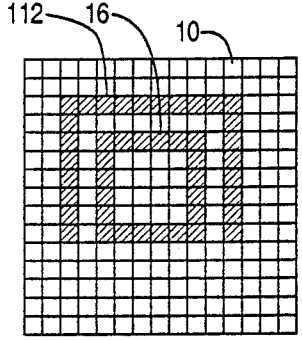
Figure 10F:
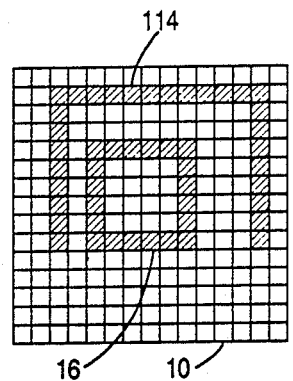
Figure 10G:
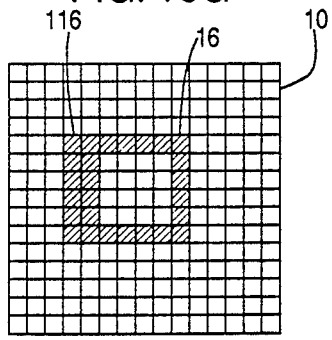
Figure 10H:
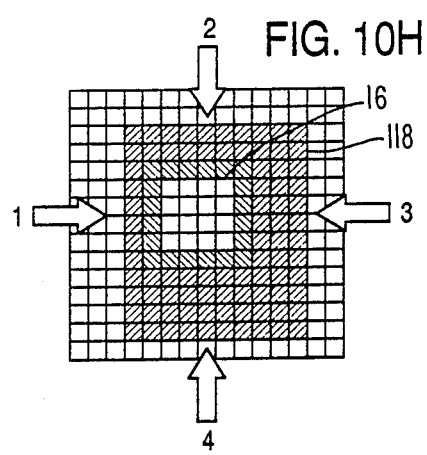

FIGS. 10A-10H illustrate symbols which can provide additional timing or symbolic information. The data cell bar 102 of FIG. 10A provides timing information for scanning from left to right and a mirror image of 10A will provide right to left timing. FIG. 10B provides timing and orientation information for scanning from top to bottom using bar 104, while its mirror image will provide bottom to top timing. The two sided border 106 of FIG. 10C provides timing and orientation information both vertically and horizontally. FIG. 10D can be used in a system in which the direction the symbol enters the image field is needed. The provision of the unequally spaced bars 108 and 110 allows the direction in which the symbol moves into the image field to be determined by comparing the relationship of the bars in one image frame with the relationship of the bars in a second image frame. The u-shaped data cell line 112 in FIG. 10E allows timing to be determined from three different directions, while FIG. 10F allows determination of direction of travel along with timing information from the line 114. FIG. 10G also allows orientation to be determined by the provision of the unequal width border side 116. FIG. 10H allows scanning in any direction as well as orientation determination using a variable width additional timing border 118.

Figure 11:
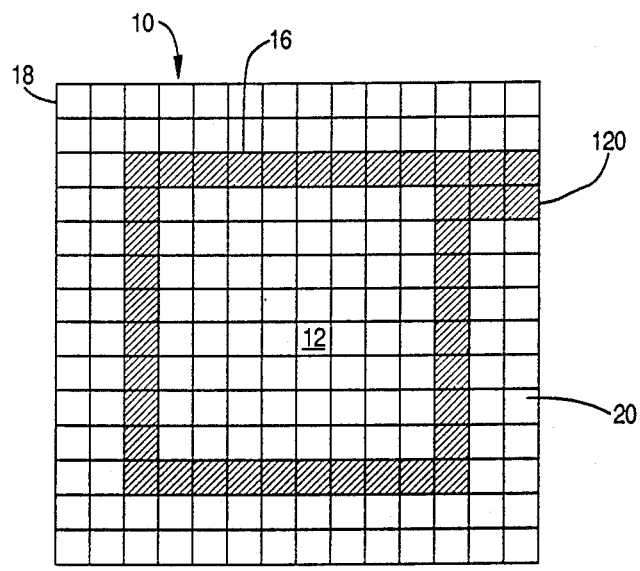
FIGS. 11 and 12 illustrate additional orientation data cells.
Figure 12:
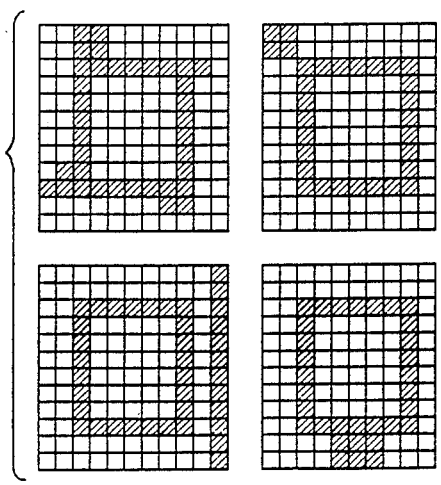

FIG. 11 illustrates another symbol 10 in which orientation can be quickly determined by external orientation cells 120. Once the border is located the computer 42 need only sample data cells 20 in the external data field 18 exterior and adjacent to the border until the orientation cells 120 are found. FIG. 12 illustrates other forms of the external orientation cells 120 which can be used.

It is also possible to determine orientation of a symbol 10 if the internal data field 12 for a particular application has a unique internal data cell pattern for each symbol 10 used in the application. To determine orientation once the data cell values in the internal field 12 are known, the data from the sampled symbol would be compared to all the possible identification symbols in the particular application in each of their possible orientations. A match would identify the symbol and the orientation.

Figure 13:
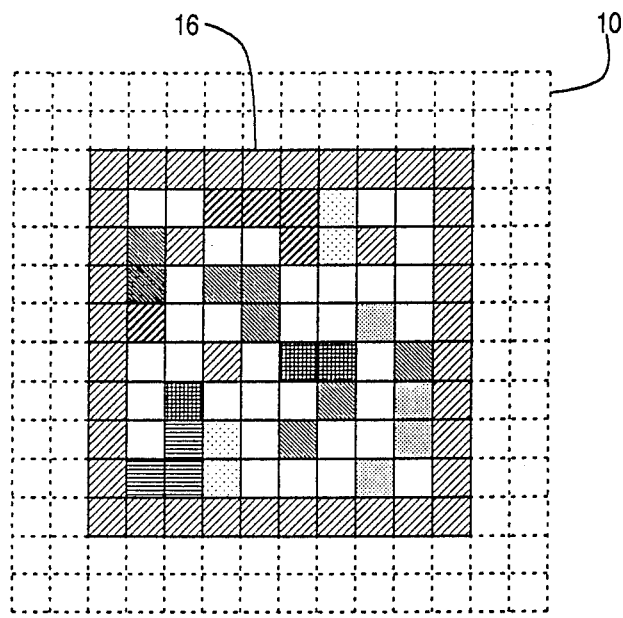
FIG. 13 illustrates gray-scale or color scale data cells.

FIG. 13 represents a symbol 10 in which the data cells are represented as gray shades on a gray scale or using colors on a color scale ranging from ultraviolet to infrared. The use of a gray scale or a color scale in the symbol 10 will allow stacking of data within the symbol 10, thereby further increasing information density. For example the particular color or gray scale level of a data cell may represent a note in a song while the position of the cell in the symbol represents the sequence in which the note is played.

Figure 14:
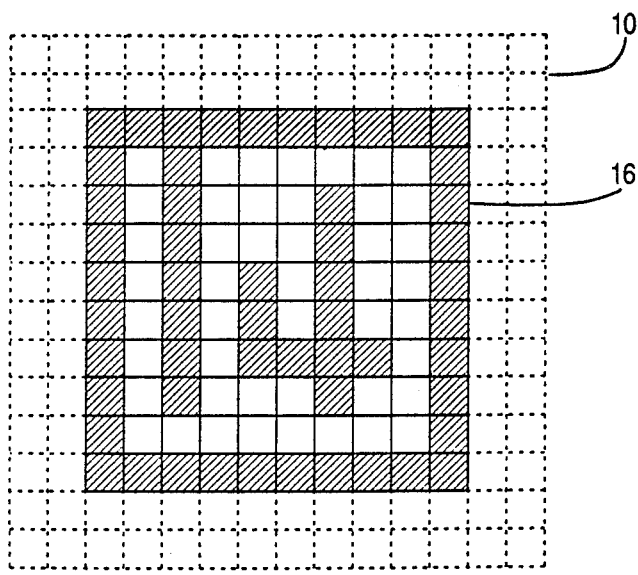
FIG. 14 illustrates a human-readable symbol 10.

FIG. 14 provides a symbol 10 which is not only readable by machine using magnetic ink character recognition as well as optical recognition, but can also be read by a human without additional decoding or interpretation information. Such a symbol can include not only alphabetic and numeric information but Morse code and other well known information formats.

Figure 15:
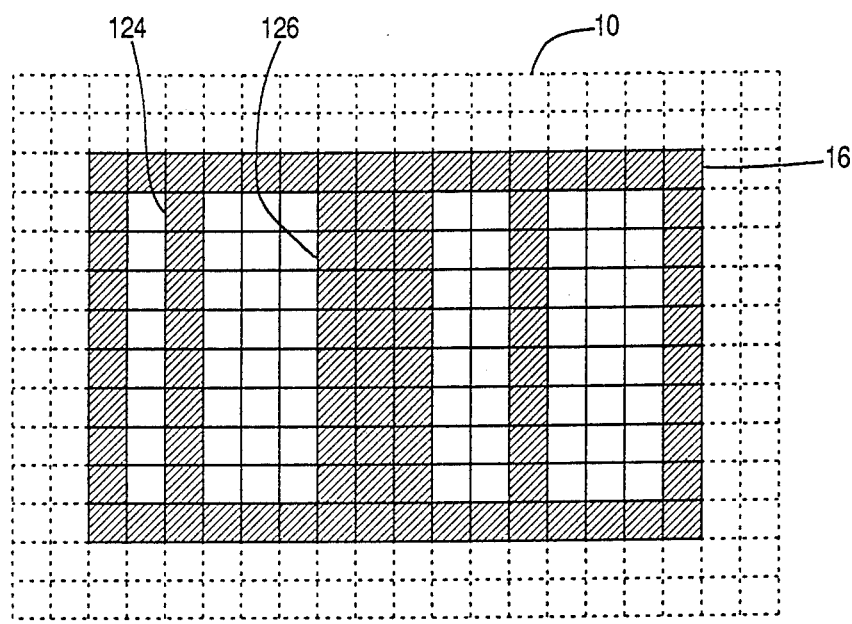
FIGS. 15-17 depict variations on the symbol 10.
Figure 16:
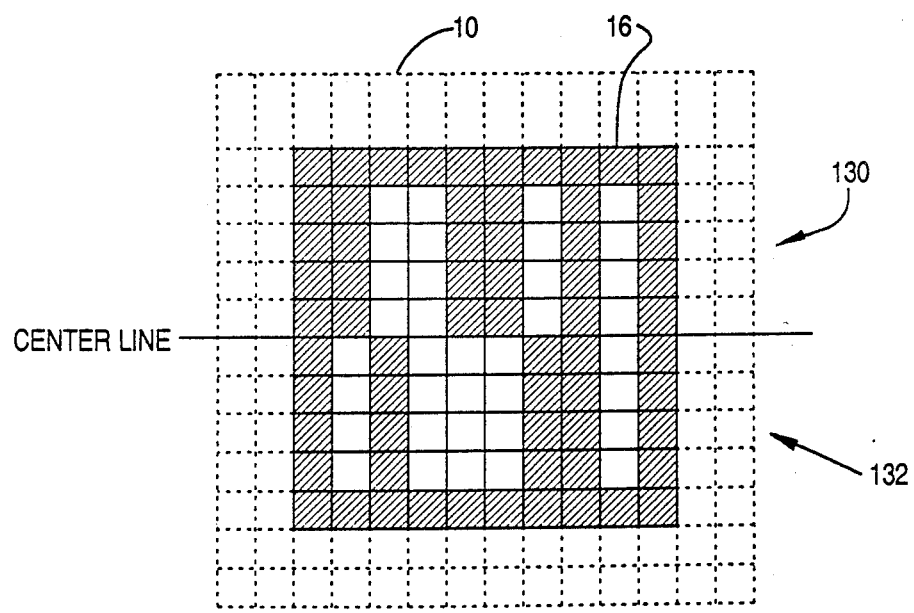

FIG. 15 illustrates a symbol 10 that can be read by a vision system as described herein as well as a bar code reader. This symbol 10 can substitute for a bar code symbol. The symbol 10 represents the varying width columns with vertical regions 124 and 126 where the number of adjacent data cells with the same value vary. The width variations can be made as fine as an image pixel width by defining each data cell as single pixel. FIG. 16 represents a symbol which can function as two adjacent or stacked column codes 130 and 132.

Figure 17:
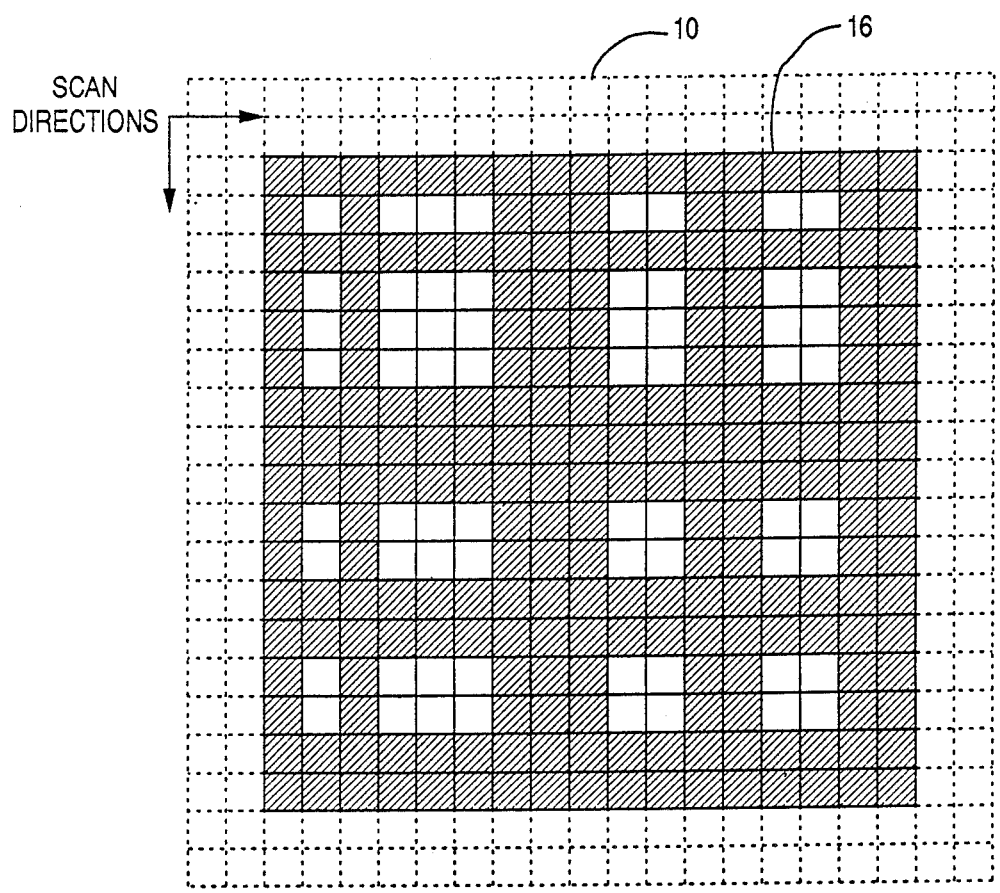

FIG. 17 illustrates a symbol in which the data represented is semi-symmetrical (bi-directional) which will facilitate the decoding process.

Figure 18:
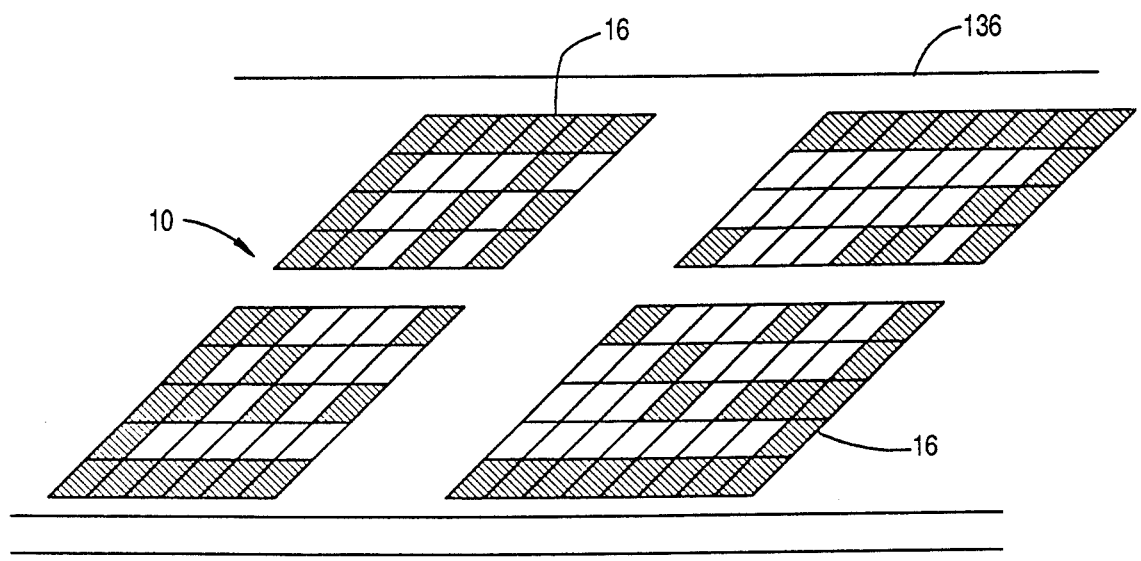
FIGS. 18-20 show dispersed symbols 10.
Figure 19:
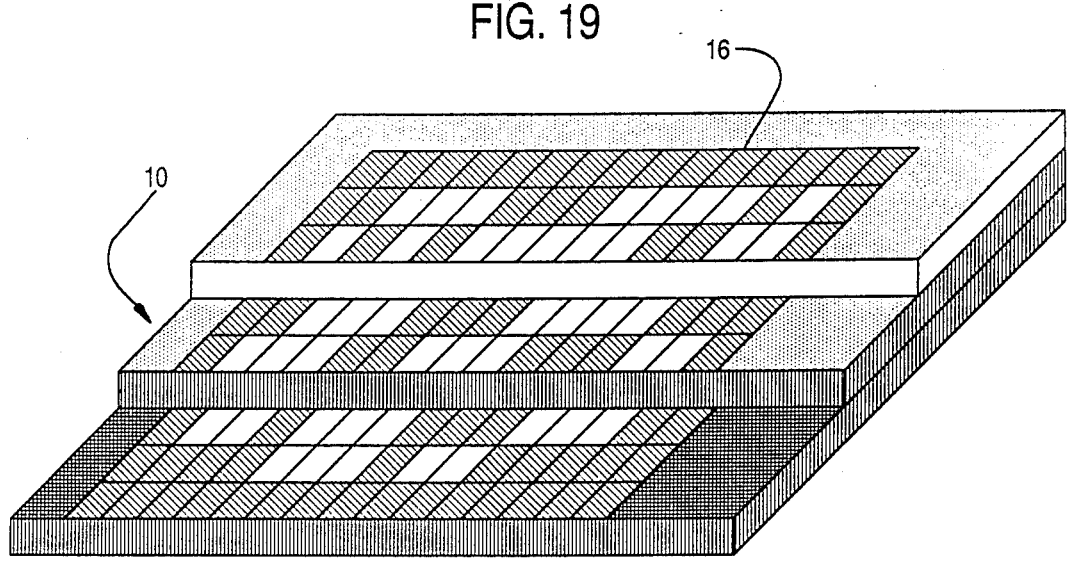
Figure 20:
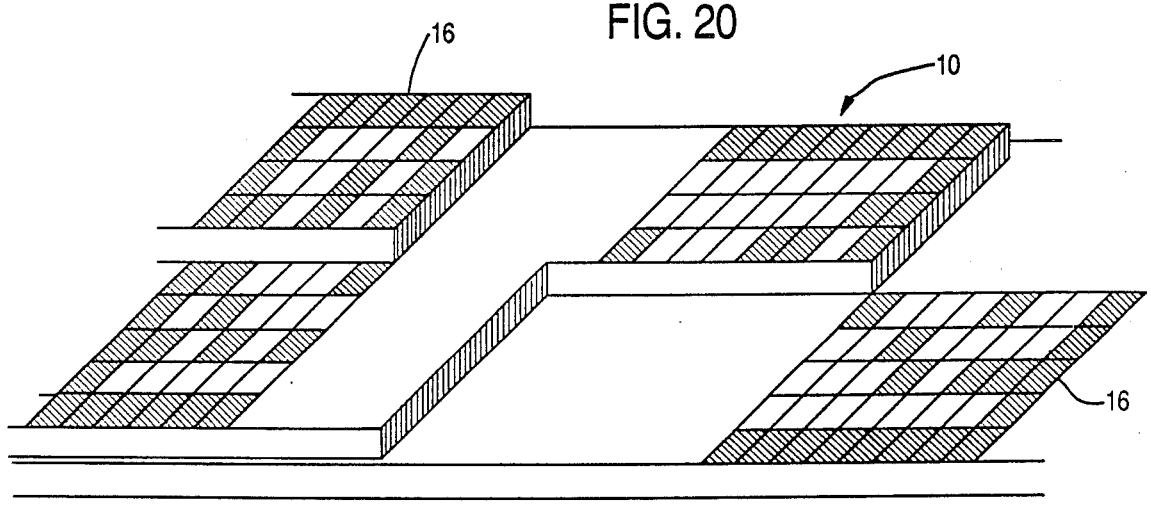

FIG. 18 illustrates how a single symbol can be dispersed within a plane of a substrate 136 or substrates. For example, the symbol can be dispersed on different adjacent parts which allows correct automated assembly to be checked by matching the image symbol to a reference symbol representing correct assembly. Multiple symbols rather than segments of a single symbol can also be used for such automated assembly checking and even for security identification purposes. FIGS. 19 and 20 illustrate symbols dispersed on different planes of an object or objects. Once again multiple complete symbols can be used for the alignment task.

Figure 21:
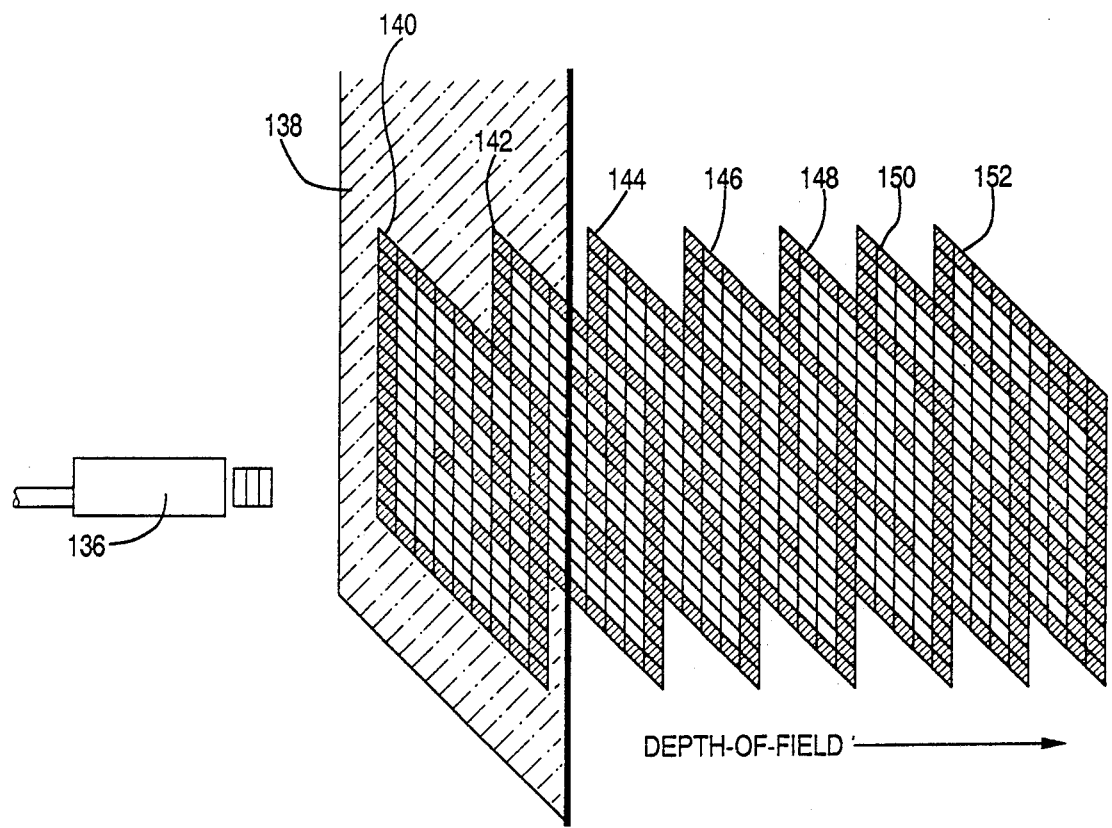
FIGS. 21 and 22 illustrate holographic symbols 10.
Figure 22:
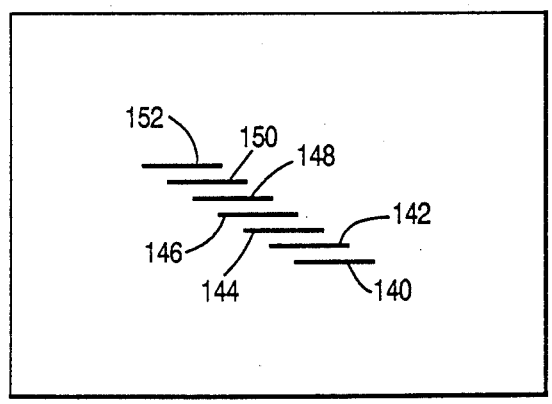

FIG. 21 illustrates a camera 136 which has a controllable depth of field and focus capability for imaging a film hologram 138 in which symbol images 140-152 are reproduced at varying depths within the holographic image. FIG. 22 illustrates how these images 140-152 could be offset within the image produced by the holographic imaging system.

It is also possible to combine the symbols of the present invention with other symbols such as the bar code symbol, circular symbol, magnetically encoded characters and optically-human readable characters. The symbol as described herein is described as being rectilinear, however, it is possible for a symbol with a border to be any polygonal shape, such as a triangle, octagon or parallelogram depending on the need.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What we claim is:

1. An identification symbol, comprising:
   a computer readable data matrix data field providing symbol information for uniquely identifying the symbol; and
   a computer readable orientation border positioned adjacent said field on at least two sides.

2. A symbol as recited in claim 1, wherein said border further comprises a timing border for data capture timing.

3. A symbol as recited in claim 1, wherein said orientation border surrounds said field.

4. An identification symbol, comprising:
   a square data matrix data field providing symbol information; and
   an orientation border positioned adjacent said field on at least two sides.

5. An identification symbol, comprising:
   a matrix data cell data field providing symbol information; and
   an orientation border positioned adjacent said field on at least two sides, said border comprising a width of a known number of data cells.

6. An identification symbol, comprising:
   a data matrix data field providing symbol information;
   an orientation border positioned adjacent said field on at least two sides; and
   a timing line of data cells adjacent said border.

7. A symbol as recited in claim 6, wherein said timing line is on two sides of said border.

8. A symbol as recited in claim 7, wherein said timing line is a different distance from the border on each side.

9. A symbol as recited in claim 6, wherein said timing line is on three sides of said border.

10. A symbol as recited in claim 9, wherein said timing line is a different distance from the border on each side.

11. A symbol as recited in claim 6, wherein said timing line surrounds said border.

12. A symbol as recited in claim 11, wherein said timing line is a different distance from the border on each line.

13. An identification symbol, comprising:
    a data field providing symbol information;
    a computer readable orientation border positioned adjacent said field at least two sides; and
    a timing cell in said field.

14. An identification symbol, comprising:
    a data matrix data field providing symbol information;
    an orientation border positioned adjacent said field on at least two sides; and
    a timing cell outside said border.

15. An identification symbol, comprising:
    a data matrix data field providing symbol information;
    an orientation border positioned adjacent said field on at least two sides; and
    an orientation cell outside said border.

16. A symbol as recited in claim 5, wherein said data cells are encoded using a gray scale.

17. A symbol as recited in claim 5, wherein said data cells are encoded using a color scale.

18. An identification symbol, comprising:
    a substrate;
    an internal data matrix data field of information data cells representing first information and formed on said substrate;
    data cells for orientation and timing surrounding said internal data field and formed on said substrate; and
    an external data field of information data cells representing second information and formed on said substrate.

19. An apparatus, comprising:
    image capture means for obtaining image data representing an image field including a symbol comprising a rectilinear data matrix data field of information data cells and an orientation border surrounding the data field; and decoding means for processing the image data to identify the border, determine orientation and timing information from the border and sample the data cells.

20. An apparatus, comprising:

means for producing a symbol image of a symbol comprising a rectilinear data matrix data field of information data cells and an orientation border surrounding the data field; and means for forming the image on a substrate.

* * * * *

UNITED STATES PATENT AND TRADEMARK OFFICE
CERTIFICATE OF CORRECTION

PATENT NO. : 4,924,078

DATED : May 8, 1990

INVENTOR(S) : Carl Sant'Anselmo et al.

It is certified that error appears in the above-identified patent and that said Letters Patent is hereby corrected as shown below:

Col. 1, line 9, delete ";";

line 10, "now abandoned and Apparatus" s/b --and Apparatus now abandoned in favor of U.S. Serial No. 306,212 filed February 3, 1989, now allowed--.

Col. 7, between lines 56 and 57 Appendix should be inserted.

Col. 8, line 31, "line" s/b --side--;

line 35, after "field" insert --on--.

Please insert "[73] Assignee: Veritec Inc., Chatsworth, CA".

[76] David C. Hooper "693 Lantana St., Apt. 74, Camarillo, Calif. 93010" s/b --24257 Del Amo Road, Ramona, CA 92065--.

UNITED STATES PATENT AND TRADEMARK OFFICE
CERTIFICATE OF CORRECTION

Page 2 of 2

PATENT NO. : 4,924,078

DATED : May 8, 1990

INVENTOR(S) : Carl Sant'Anselmo et al.

Figure 2:
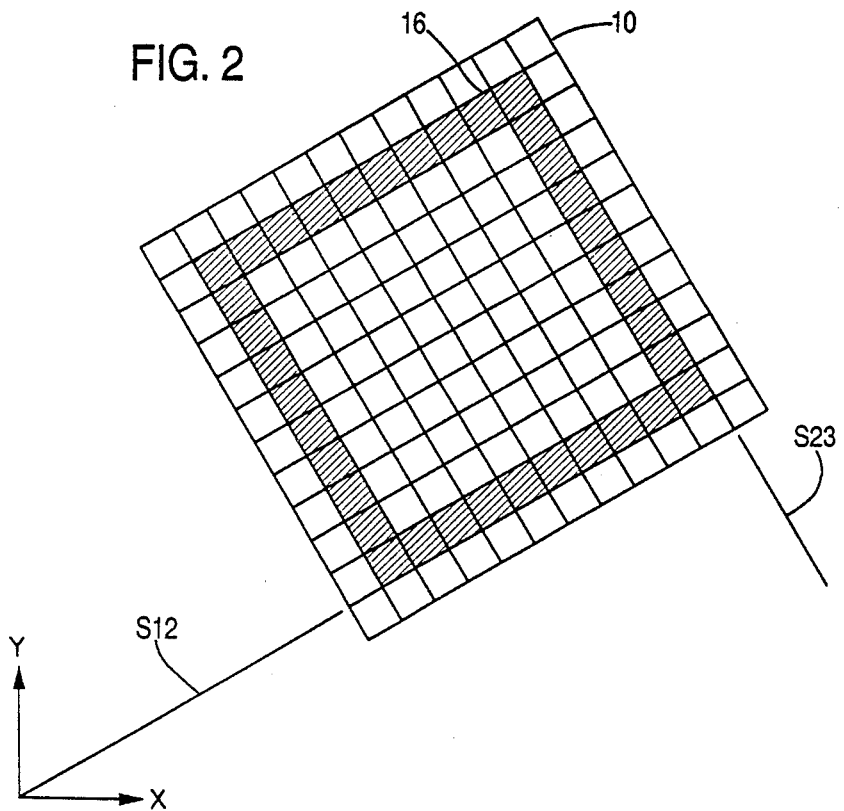
FIG. 2 illustrates a rotated symbol 10.

It is certified that error appears in the above-identified patent and that said Letters Patent is hereby corrected as shown below:

In Fig. 2 of the drawings, "S23" s/b S13.

Signed and Sealed this

Third Day of December, 1991

Attest:

HARRY F. MANBECK, JR.

*Attesting Officer*  *Commissioner of Patents and Trademarks*

(12) EX PARTE REEXAMINATION CERTIFICATE (6911th)
United States Patent
Sant'Anselmo et al.

(10) Number: US 4,924,078 C1
(45) Certificate Issued: Jul. 7, 2009

(54) IDENTIFICATION SYMBOL, SYSTEM AND METHOD

(75) Inventors: Carl Sant'Anselmo, Rancho Palos Verdes, CA (US); Robert Sant'Anselmo, Canoga Park, CA (US); David C. Hooper, Camarillo, CA (US)

(73) Assignee: VCode Holdings, Inc., Golden Valley, MN (US)

Reexamination Request:
No. 90/008,204, Oct. 26, 2006

Reexamination Certificate for:
Patent No.: 4,924,078
Issued: May 8, 1990
Appl. No.: 07/125,616
Filed: Nov. 25, 1987

Certificate of Correction issued Dec. 3, 1991.

(51) Int. Cl.
*G06K 7/14* (2006.01)
*G06K 19/06* (2006.01)

(52) U.S. Cl. .................. 235/494; 235/487; 283/117; 283/74; 347/107

(58) Field of Classification Search .................. None
See application file for complete search history.

(56) References Cited

U.S. PATENT DOCUMENTS

| | | |
|---|---|---|
| 3,553,437 A | 1/1971 | Boothroyd |
| 3,594,735 A | 7/1971 | Furlong et al. |
| 3,603,728 A | 9/1971 | Arimura |
| 3,632,993 A | 1/1972 | Acker |
| 3,632,995 A | 1/1972 | Wilson |
| 3,660,641 A | 5/1972 | Levasseur |
| 3,684,867 A | 8/1972 | Acker |
| 3,693,154 A | 9/1972 | Kubo et al. |
| 3,701,098 A | 10/1972 | Acker |
| 3,728,677 A | 4/1973 | Munson |
| 3,800,282 A | 3/1974 | Acker |
| 3,801,775 A | 4/1974 | Acker |
| 3,835,297 A | 9/1974 | Inoue et al. |

(Continued)

FOREIGN PATENT DOCUMENTS

| | | |
|---|---|---|
| EP | 155982 | 6/1981 |
| EP | 0081316 | 11/1982 |
| JP | 60-027074 | 2/1985 |
| JP | 61-065375 | 4/1986 |

OTHER PUBLICATIONS

Brochure advertising the "Vericode Identification System," published before or during Jul. 1986 (4 pages).

(Continued)

*Primary Examiner*—Deandra M Hughes

(57) ABSTRACT

The present invention is a symbol 10 that includes a square array 12 of data cells 14 surrounded by a border 30 of orientation and timing data cells. The border 30 can be surrounded by an external data field 18 also including information data cells 20. The orientation and timing for sampling each data cell can be determined from the border 30 or from additional orientation and timing cells in the internal data field 12 or external data field 18. A system 40 and 42 is also included that captures an image of the symbol, determines symbol orientation, decodes the contents of the symbol and outputs the decoded contents to a display or other device. The present invention also includes a device 48 that can produce symbols on a substrate such as a label.

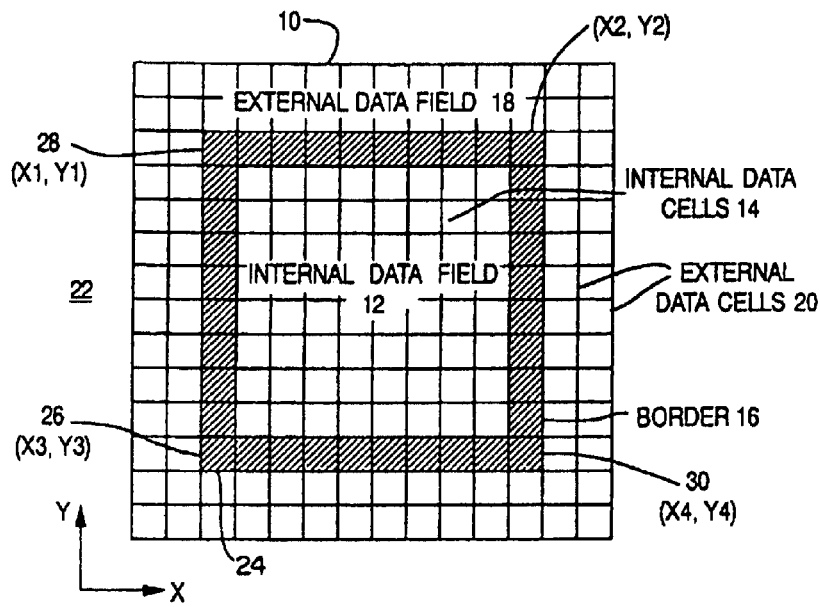

U.S. PATENT DOCUMENTS

| | | |
|---|---|---|
| 3,847,346 A | 11/1974 | Dolch |
| 3,873,973 A | 3/1975 | Acker |
| 3,916,160 A | 10/1975 | Russo et al. |
| 4,007,377 A | 2/1977 | Simon et al. |
| 4,138,058 A | 2/1979 | Atalla |
| 4,213,040 A | 7/1980 | Gokey et al. |
| 4,263,504 A | 4/1981 | Thomas |
| 4,275,381 A | 6/1981 | Siegal |
| 4,286,146 A | 8/1981 | Uno et al. |
| 4,409,469 A | 10/1983 | Yasuda et al. |
| 4,424,587 A | 1/1984 | Wevelsiep et al. |
| 4,488,679 A | 12/1984 | Bockholt et al. |
| 4,534,031 A | 8/1985 | Jewer |
| 4,591,704 A | 5/1986 | Sherwood et al. |
| 4,613,942 A | 9/1986 | Chen |
| 4,634,850 A | 1/1987 | Pierce et al. |
| 4,707,612 A | 11/1987 | Martin |
| 4,724,322 A | 2/1988 | Knowles et al. |
| 4,736,109 A | 4/1988 | Dvorsak |
| 4,746,789 A | 5/1988 | Gieles et al. |
| 4,782,221 A | 11/1988 | Brass et al. |
| 4,786,792 A | 11/1988 | Pierce et al. |
| 4,794,239 A | 12/1988 | Allais |
| 4,811,321 A | 3/1989 | Enari et al. |
| 4,874,936 A | 10/1989 | Chandler et al. |
| 4,910,725 A | 3/1990 | Drexler |
| 4,998,010 A | 3/1991 | Chandler et al. |
| 5,128,526 A | 7/1992 | Yoshida |
| 5,612,524 A | 3/1997 | Sant' Anselmo et al. |

OTHER PUBLICATIONS

Patrick Dalton, Technologies for Security Environments, published in Conference Proceedings, Scan–Tech '86 Conference, Oct. 15–17, 1986, pp. 42–65 (24 pages).

Bryan Cockel, "I: When Bar Coding Can't Fit the Real Estate," published in Automatic I.D. News, Oct. 1986 (1 page).

Order Denying Plaintiff Cognex Corporation's Motion of Feb. 22, 2008, in *Cognex Corporation v. VCode Holdings, Inc.*, et al., Case No. 06–cv–1040 JNE/JJG, U.S. District Court for the District of Minnesota (hereinafter, "*Cognex v. VCode*"); Mar. 12, 2008 (1 page).

Defendants' Opposition to Cognex's Motion of Feb. 22, 2008, in *Cognex v. VCode et al.*; pp. 1–27; Mar. 7, 2008 (27 pages).

Declaration of Edward E. Casto in Support of Defendants' Opposition to Cognex's Motion of Feb. 22, 2008 ("Casto Decl.") in *Cognex v. VCode et al.*; pp. 1–3; Mar. 6, 2008 (3 pages).

Exhibit 1 to the Casto Decl. of Mar. 6, 2006: Storytelling in the Classroom: The Boy Who Cried Wolf; 1 page (2 pages).

Exhibit 2 to Casto Decl.: Declaration of Robert Sant'Anselmo in Reexamination Proceeding No. 90/007,980; pp. 1–6; filed Jan. 31, 2008 (7 pages).

Exhibits 3–1 and 3–2 to Casto Decl.: Transcript of Video Deposition of Val DiEuliis in *Cognex v. VCode et al.*; pp. 1, 28–33, 60–62, 65–66, 68–71, 179–180, 199, 202 and 201; Nov. 26, 2007 (23 pages).

Exhibits 4–1 and 4–2 to Casto Decl.: Declaration of Val DiEuliis in Support of Defendant's Opposition to Plaintiff's Motions for Partial Summary Judgment, in *Cognex v. VCode et al.*, pp. 1–59; Nov. 14, 2007 (61 pages).

Exhibits 5–1 and 5–2 to Casto Decl.: Information Disclosure Statement Under 37 C.F.R. § 1.555(a) and Citation Form PTO/SB/08 in Reexamination Proceeding No. 90/007,980; IDS pp. 1–2 and Form pp. 1–17; filed Jan. 28, 2008 (21 pages).

Exhibit 6 to Casto Decl.: E–mail from Steven Hartsell to Kevin Gannon; 1 page; Jul. 12, 2007 (2 pages).

Exhibit 7 to Casto Decl.: Letter from Kevin Gannon to Edward Casto; Mar. 30, 2007 (6 pages).

Exhibit 8 to Casto Decl.: Transcript of Oral and Videotaped Deposition of Van Tran; pp. 1, 9–17, and 118–120; Jul. 10, 2007 (14 pages).

Exhibit 9 to Casto Decl.: Transcript of Deposition of Shawn Makanvand; pp. 1, 13, 80–82, and 105; Oct. 6, 2007 (7 pages).

Exhibits 10–1 and 10–2 to Casto Decl.: Patent Owners' Response to First Office Action in Reexamination Proceeding No. 90/007,980; pp. 3–21; Feb. 1, 2008 (21 pages).

Exhibit 11 to Casto Decl.: Patent Owner's Communication to the Patent Office in Reexamination Proceeding No. 90/007,980; pp. 1–3, 5, 9, 12, 14–15, and 17; Mar. 5, 2008 (16 pages).

Exhibit 12 to Casto Decl.: Exhibits Used by Defendants at Markman Hearing in *Cognex v. VCode et al.*; Mar. 6, 2008 (4 pages).

Exhibit 13 to Casto Decl.: Transcript of Motions Hearing Before the Honorable Joan Ericksen, in *Cognex v. VCode et al.*; pp. 1–2, 5, 8–10, 22, 85–86; Sep. 7, 2007 (10 pages).

Exhibit 14 to Casto Decl.: Chart Showing Documents Previously Submitted to the Patent Office in Connedtion With the '524 Patent Re–examination Cited In Cognex's Motion, 2 pages; Mar. 6, 2008 (3 pages).

Exhibit 15 to Casto Decl.: Information Disclosure Statement Under 37 C.F.R. § 1.555(a) and Citation Form PTO/SB/08 in Reexamination Proceeding No. 90/007,980; Mar. 6, 2008 (6 pages).

Exhibit 16 to Casto Decl.: *Weatherford International Inc.* v. *Casetech International Inc.*, Lexis 12195, pp. 1–2; Mar. 8, 2006 (3 pages).

Plaintiff's Motion dated Feb. 22, 2008 in *Cognex v. VCode et al.*, pp. 1–3 (3 pages).

Plaintiff Cognex Corporation's Memorandum in Support of Its Motion dated Feb. 22, 2008, in *Cognex v. VCode et al.*; pp. 1–27. Exhibit 1: Chart discussing documents and statements of fact, pp. 1–12 (39 pages).

Declaration of Peter Nikolai in Support of Plaintiff's Motion dated Feb. 22, 2008, in *Cognex v. VCode et al.*; Feb. 22, 2008; 1 page. Exhibit A: *Monsanto Company* v. *Bayer Bioscience*; pp. 1–13; Jan. 25, 2008 (15 pages).

Declaration of R. Carl Moy in Support of Plaintiff Cognex Corporation's Motion dated Feb. 22, 2008, in *Cognex v. VCode et al.*; pp. 1–5; Feb. 22, 2008 (5 pages).

Declaration of Byron Galvez in *Cognex v. VCode et al.*; pp. 1–2; Feb. 21 2008 (2 pages).

Declaration of Kevin Gannon in Support of Plaintiff's Motion dated Feb. 22, 2008 ("Gannon Decl."), in *Cognex v. VCode et al.*, pp. 1–3; Feb. 22, 2008 (3 pages).

Exhibit A to Gannon Decl. of Feb. 22, 2008: Vericode pamphlet, pp. 1–4 (5 pages).

Exhibit B to Gannon Decl.: Transcript of Videotaped Deposition of Patrick Dalton, in *Cognex* v. *VCode et al.*; pp. 1, 56,57, 59, 77, 78, 84,85, 88–93, and 227; Jun. 4, 2007 (16 pages).
Exhibit C to Gannon Decl.: Information Disclosure Statement Under 37 C.F.R § 1.555(a) and Citation Form PTO/SB/08 in Reexamination Proceeding No. 90/007,980; IDS pp. 1–2, Form pp. 1–17; Jan. 28, 2008 (20 pages).
Exhibit D to Gannon Decl.: Amendment filed with the Patent Office in Reexamination Proceeding No. 90/007,980; pp. 1–21; Feb. 1, 2008 (22 pages).
Exhibit E to Gannon Decl.: Transcript of Video Deposition of Val DiEuliis; pp. 1–201; Nov. 26, 2007 (52 pages).
Exhibit F to Gannon Decl.: Declaration of Robert Sant'Anselmo; pp. 1–6; Jan. 31, 2008 (7 pages).
Exhibit G to Gannon Decl.: Transcript of Videotaped Deposition of Carl S. Anselmo; pp. 1, 18, 56, 130, 209–211; Jul. 28, 2007 (8 pages).
Exhibit H to Gannon Decl.: Transcript of Deposition of Robert Anselmo; pp. 1, 181, 188, and 189; Feb. 11, 1993 ( 5 pages).
Exhibit I to Gannon Decl.: The characteristics and decodability of the Universal Product Code symbol, IBM Systems Journal, vol. 14, No. 1; pp. 16–34; 1975 (21 pages).
Exhibit J to Gannon Decl.: Transcript of Deposition of Carl Sant'Anselmo; pp. 1, 89, and 90; Jul. 9, 1993 (4 pages).
Exhibit K to Gannon Decl.: Transcript of Videotaped Deposition of Robert Anselmo; pp. 1, 150–151, and 372; Jul. 17, 2007 (5 pages).
Summary Judgment Order dated May 19, 2008 in *Cognex* v. *VCode et al.*; pp. 1–64 (64 pages).
Final Office Action dated May 15, 2008 in related copending Reexamination Control No. 90/007,980 (28 pages).
Transcript of videotaped deposition of Carl S. Anselmo, *Cognex Corporation* vs. *VCode Holdings, Inc., VData, LLC, Acacia Research Corporation and Veritec, Inc.* ("*Cognex* v. *VCode* litigation"); Jul. 28, 2007; pp. 1–301 (76 sheets).
Sketch, 1 page, Exhibit 4 introduced on p. 61 of the transcript of the Jul. 28, 2007 deposition of Carl S. Anselmo taken in the *Cognex* v. *VCode* litigation.
Anselmo, R.S.; "Scan Technology." Security Systems Administration; Aug. 1986; pp. 28, 29, and 43; Exhibit 5 introduced on p. 124 of the transcript of the Jul. 28, 2007 deposition of Carl S. Anselmo taken in the *Cognex* v. *VCode* litigation; Exhibit 34 introduced on p. 251 of the transcript of the Jul. 17, 2007 deposition of Robert Anselmo taken in the *Cognex* v. *VCode* litigation.
Memorandum from C. Anselmo to R. Anselmo and attached final specification of Portable Scanner; Feb. 17, 1986; pp. 2–14; Exhibit 6 introduced on p. 128 of the transcript of the Jul. 28, 2007 deposition of Carl S. Anselmo taken in the *Cognex* v. *VCode* litigation; Exhibit 9 introduced on p. 95 of the transcript of the Jul. 17, 2007 deposition of Robert Anselmo taken in the *Cognex* v. *VCode* litigation.
Facsimile from R. Anselmo to C. Anselmo and patterns (2 pages) and attached Study of Vericode Symbology Technology; Jan. 15, 1986; pp. 4, 5, 6, and 8; Exhibit 7 introduced on p. 147 of the transcript of the Jul. 28, 2007 deposition of Carl S. Anselmo taken in the *Cognex* v. *VCode* litigation; Exhibit 23 introduced on p. 210 of the transcript of the Jul. 17, 2007 deposition of Robert Anselmo taken in the *Cognex* v. *VCode* litigation; Exhibit 16 introduced on p. 59 of the transcript of the Jun. 4, 2007 deposition of Patrick Dalton taken in the *Cognex* v. *VCode* litigation.

Facsimile from Carl Anselmo to Bob Anselmo re: patent information; Jul. 24, 1986; 1 page; and attachment titled "A New Technique for the Generation and Acquisition of Compact Machine Readable Codes and Symbols"; pp. 1–12; Exhibit 8 introduced on p. 155 of the transcript of the Jul. 28, 2007 deposition of Carl S. Anselmo taken in the *Cognex* v. *VCode* litigation; Exhibit 28 introduced on p. 235 of the transcript of the Jul. 17, 2007 deposition of Robert Anselmo taken in the *Cognex* v. *VCode* litigation Exhibit 48 of Declaration of Kevin Gannon in support of Plaintiff's Motion for Partial Summary Judgment on Count II of its First Supplemental Complaint/Invalidity in the *Cognex* v. *VCode* litigation.

Facsimile from C.S. Anselmo to Veritec re: Preliminary Copy of Patent disclosure to be entered into safe deposit box; Sep. 10, 1986, 1 page; and attachment titled "A New Technique for the Generation and Acquisition of Compact Machine Readable Codes and Symbols"; pp. 1–12 and drawings (14 pages); Exhibit 9A introduced on p. 158 of the transcript of the Jul. 28, 2007 deposition of Carl S. Anselmo taken in the *Cognex* v. *VCode* litigation; Exhibit 7 introduced on p. 76 of the transcript of the Jul. 17, 2007 deposition of Robert Anselmo taken in the *Cognex* v. *VCode* litigation; Exhibit 18 introduced on p. 122 of the transcript of the Jul. 14, 2007 deposition of David C. Hooper taken in the *Cognex* v. *VCode* litigation; Exhibit 36 of Declaration of Kevin Gannon in support of Plaintiff's Motion for Partial Summary Judgment on Count II of its First Supplemental Complaint/Invalidity in the *Cognex* v. *VCode* litigation;

Exhibit 14 of Declaration of Steven W. Hartsell in support of Defendants' Motion for Partial Summary Judgment on Count II of its First Supplemental Complaint/Invalidity in the *Cognex* v. *VCode* litigation.

Facsimile from C. Anselmo to Veritec; and preliminary copy of patent disclosure entitled "A New Technique for the Generation and Acquisition of Compact Machine Readable Codes and Symbols;" 1986 pp. 1–12 and drawings (14 pages); Exhibit 9B introduced on p. 158 of the transcript of the Jul. 28, 2007 deposition of Carl S. Anselmo taken in the *Cognex* v. *VCode* litigation; Exhibit 8 introduced on p. 86 of the transcript of the Jul. 17, 2007 deposition of Robert Anselmo taken in the *Cognex* v. *VCode* litigation; Exhibit 41 introduced on p. 144 of the transcript of the Jun. 4, 2007 deposition of Patrick Dalton taken in the *Cognex* v. *VCode* litigation; Exhibit 17 introduced on p. 120 of the transcript of the Jul. 14, 2007 deposition of David C. Hooper taken in the *Cognex* v. *VCode* litigation.

Memorandum from R. Anselmo to D. Priddy re:Status of Veritrak System; Sep. 11, 1986; 1 page; Exhibit 10 introduced on p. 165 of the transcript of the Jul. 28, 2007 deposition of Carl S. Anselmo taken in the *Cognex* v. *VCode* litigation; Exhibit 26 introduced on p. 228 of the transcript fo the Jul. 17 2007 deposition of Robert Anselmo taken in the *Cognex* v. *VCode* litigation.

Facsimile from R. Anselmo to D. Priddy and outline of presentation "Saturn Plant/General Motors Automatic Security I.D. System" 2 pages; Sep. 3, 1986; Exhibit 11 introduced on p. 174 of the transcript of the Jul. 28, 2007 deposition of Carl S Anselmo taken in the *Cognex* v. *VCode* litigation; Exhibit 27 introduced on p. 223 of the transcript of the Jul. 17, 2007 deposition of Robert Anselmo taken in the *Cognex* v. *VCode* litigation; Exhibit 26 of Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Letter from R. Anselmo to J. Davis re: the Vericode Identification System; Jun. 23, 1986; 4 pages; Exhibit 12 introduced on p. 178 of the transcript of the Jul. 28, 2007 deposition of Carl S. Anselmo taken in the *Cognex* v. *VCode* litigation; Exhibit 25 introduced on p. 223 of the transcript of the Jul. 17, 2007 deposition of Robert Anselmo taken in the *Cognex* v. *VCode* litigation.

Letter from R. Anselmo to J. Frawley re: Veritec's Demonstration Unit (1 page) and quotation (1 page); May 20, 1986; Exhibit 13 introduced on p. 188 of the transcript of the Jul. 28, 2007 deposition of Carl S. Anselmo taken in the *Cognex* v. *VCode* litigation; Exhibit 24 introduced on p. 220 of the transcript of the Jul. 17, 2007 deposition of Robert Anselmo taken in the *Cognex* v. *VCode* litigation.

Letter from P. Dalton to R. Huntsinger re: Vericode Secutiry Identification System; Vericode, and Covert Identification System; Feb. 18, 1986, 1 page; Exhibit 14 introduced on p. 191 of the transcript of the Jul. 28, 2007 deposition of Carl S. Anselmo taken in the *Cognex* v. *VCode* litigation; Exhibit 22 introduced on p. 208 of the transcript of the Jul. 17, 2007 deposition of Robert Anselmo taken in the *Cognex* v. *VCode* litigation; Exhibit 20 introduced on p. 75 of the transcript of the Jun. 4, 2007 deposition of Patrick Dalton taken in the *Cognex* v. *VCode* litigation.

Letter from Patrick L. Dalton to Tom Brichford, Ford Motor Company re: videocassette copy of V.I.N. and Vericode; Nov. 11, 1985; 2 pages; Exhibit 15 introduced on p. 196 of the transcript of the Jul. 28, 2007 deposition of Carl S. Anselmo taken in the *Cognex* v. *VCode* litigation; Exhibit 21 introduced on p. 207 of the transcript of the Jul. 17, 2007 deposition of Robert Anselmo taken in the *Cognex* v. *VCode* litigation; Exhibit 15 introduced on p. 57 of the transcript of the Jun. 4, 2007 deposition of Patrick Dalton taken in the *Cognex* v. *VCode* litigation; Exhibit 21 of Declaration of Kevin Gannon in support of Plaintiff's Motion for Partial Summary Judgment on Count II of its First Supplemental Complaint/Invalidity in the *Cognex* v. *VCode* litigation.

Letter from Patrick L. Dalton to Joseph Paszek, Chrysler Corporation re: videocassette copy of V.I.N and Vericode; Oct. 25, 1985; 2 pages; Exhibit 16 introduced on p. 198 of the transcript of the Jul. 28, 2007 deposition of Carl S. Anselmo taken in the *Cognex* v. *VCode* litigation; Exhibit 20 introduced on p. 201 of the transcript of the Jul. 17, 2007 deposition of Robert Anselmo taken in the *Cognex* v. *VCode* litigation; Exhibit 12 introduced on p. 46 of the transcript of the Jun. 4, 2007 deposition of Patrick Dalton taken in the *Cognex* v. *VCode* litigation; Exhibit 19 of Declaration of Kevin Gannon in support of Plaintiff's Motion for Partial Summary Judgment on Count II of its First Supplemental Complaint/Invalidity in the *Cognex* v. *VCode* litigation.

Letter from R. Anselmo to S. Simpson re: Coding of Cast Aluminum Road Wheels, Vericode Identification System; Sep. 12, 1985; 5 pages; Exhibit 17 introduced on p. 201 of the transcript of the Jul. 28, 2007 deposition of Carl S. Anselmo taken in the *Cognex* v. *VCode* litigation; Exhibit 19 introduced on p. 198 of the transcript of the Jul. 17, 2007 deposition of Robert Anselmo taken in the *Cognex* v. *VCode* litigation.

Facsimile from C. Anselmo to R. Stander/R. Anselmo and job descriptions (2 pages); Jan. 20 1986; Exhibit 18 introduced on p. 208 of the transcript of the Jul. 28, 2007 deposition of Carl S. Anselmo taken in the *Cognex* v. *VCode* litigation; Exhibit 16 introduced on p. 192 of the transcript of the Jul. 17, 2007 deposition of Robert Anselmo and p. 208 of the transcript of the Jul. 28, 2007 deposition of Carl Anselmo taken in the *Cognex* v. *VCode* litigation.

Specification: Hand Held Scanning and Processing System (HSAPS), Veritec, Inc., Oct. 21, 1985, pp. 1–9; Exhibit 19 introduced on p. 213 of the transcript of the Jul. 28, 2007 deposition of Carl S. Anselmo taken in the *Cognex* v. *VCode* litigation; Exhibit 6 of Declaration of Kevin Gannon in support of Plaintiff's Motion for Partial Summary Judgment on Count II of its First Supplemental Complaint/Invalidity in the *Cognex* v. *VCode* litigation.

Memorandum Agreement between Veritec Inc. and Advanced Vision Systems (3 pages); Specification (5 pages); drawings (4 pages); Software Development (1 page); System Hardware (1 page); price breakdown (1 page) letter from R. Stander to M. Amini (1 page) and Amendment No. 1 to Memorandum Agreement (3 pages); Jan. 23, 1986; Exhibit 20 introduced on p. 216 of the transcript of the Jul. 28, 2007 deposition of Carl S. Anselmo taken in *Cognex* v. *VCode* litigation; Exhibit 10 introduced on p. 107 of the transcript of the Jul. 17, 2007 deposition of Robert Anselmo taken in the *Cognex* v. *VCode* litigation; Exhibit 24 introduced on p. 86 of the transcript of the Jun. 4, 2007 deposition of Patrick Dalton taken in the *Cognex* v. *VCode* litigation; Exhibit 5 of Declaration of Kevin Gannon in support of Plaintiff's Motion for Partial Summary Judgment on Count II of its First Supplemental Complaint/Invalidity in the *Cognex* v. *VCode* litigation;

Exhibit 12 of Declaration of Steven W. Hartsell in support of Defendants' Motion for Partial Summary Judgment on Count II of its First Supplemental Complaint/Invalidity in the *Cognex* v. *VCode* litigation.

Acceptance Letter by C. Anselmo that Veritec, Inc. accepts the Vericode Reader developed by Advanced Vision Systems, Inc. and packing slips; Mar. 12, 1986; Exhibit 21 introduced on p. 222 of the transcript of the Jul. 28, 2007 deposition of Carl S. Anselmo taken in the *Cognex* v. *VCode* litigation; Exhibit 3 introduced on p. 38 of the transcript of the Oct. 6, 2007 deposition of Shawn Makanvand taken in the *Cognex* v. *VCode* litigation; Exhibit 41 of Declaration of Kevin Gannon in support of Plaintiff's Motion for Partial Summary Judgment on Count II of its First Supplemental Complaint/Invalidity in the *Cognex* v. *VCode* litigation.

Memorandum from J. Campbell–Broom to C. Anselmo re: Advanced Vision Systems (AVS) equipment; Mar. 24, 1986; Exhibit 22 introduced on p. 223 of the transcript of the Jul. 28, 2007 deposition of Carl S. Anselmo taken in the *Cognex v. VCode* litigation; Exhibit 11 introduced on p. 121 of the transcript of the Jul. 17, 2007 deposition of Robert Anselmo taken in the *Cognex v. VCode* litigation; Exhibit 23 introduced on p. 83 of the transcript of the Jun. 4, 2007 deposition of Patrick Dalton taken in the *Cognex v. VCode* litigation; Exhibit 4 of Declaration of Kevin Gannon in support of Plaintiff's Motion for Partial Summary Judgment on Count II of its First Supplemental Complaint/Invalidity in the *Cognex v. VCode* litigation; Exhibit 21 of Declaration of Steven W. Hartsell in support of Defendants' Motion for Partial Summary Judgment on Count II of its First Supplemental Complaint/Invalidity in the *Cognex v. VCode* litigation.

Facsimile from C. Anselmo to R. Stander / R. Anselmo / R. Widney / P. Dalton re: Vericode System Architecture; Jan. 20, 1986; 2 pages; Exhibit 23 introduced on p. 227 of the transcript of the Jul. 28, 2007 deposition of Carl S. Anselmo taken in the *Cognex v. VCode* litigation; Exhibit 17 introduced on p. 65 of the transcript of the Jun. 4, 2007 deposition of Patrick Dalton taken in the *Cognex v. Vcode* litigation.

Dalton, "Technologies for Security Environments;" Scan–Tech '86 Proceedings Session 3/7; Oct. 15, 16, 17; pp. 42–65; Exhibit 24 introduced on p. 233 of the transcript of the Jul. 28, 2007 deposition of Carl S. Anselmo taken in the *Cognex v. VCode* litigation; Exhibit 43 introduced on p. 150 of the transcript of the Jun. 4, 2007 deposition of Patrick Dalton taken in the *Cognex v. VCode* litigation; Exhibit G from Plaintiff's Invalidity Contentions from the *Cognex v. VCode* litigation.

Facsimile from C. Anselmo to R. Anselmo re: Chori CCD Scanner; Jan. 19, 1986; 2 pages; Exhibit 25 introduced on p. 242 of the transcript of the Jul. 28, 2007 deposition of Carl S. Anselmo taken in the *Cognex v. VCode* litigation.

Facsimile from C. Anselmo to P. Dalton re: Norton & Wright Vericode; Jan. 6, 1986; Exhibit 26 introduced on p. 245 of the transcript of the Jul. 28, 2007 deposition of Carl S. Anselmo taken in the *Cognex v. VCode* litigation.

3/8" Vericodes 1–102 (1 page); Exhibit 27 introduced on p. 252 of the transcript of the Jul. 28, 2007 deposition of Carl S. Anselmo taken in the *Cognex v. VCode* litigation; Exhibit 14 introduced on p. 64 of the transcript of the Oct. 6, 2007 deposition of Shawn Makanvand taken in the *Cognex v. VCode* litigation.

Memorandum from P. Dalton to C. Anselmo re: 500 Vericodes for Norton & Wright; Dec. 22, 1986; Exhibit 28 introduced on p. 255 of the transcript of the Jul. 28, 2007 deposition of Carl S. Anselmo taken in the *Cognex v. VCode* litigation.

Transcript of videotaped deposition of Robert Anselmo, *Cognex Corporation vs. VCode Holdings, Inc., VData, LLC, Acacia Research Corporation and Veritec, Inc.*; Jul. 17, 2007; pp. 1–285 (72 sheets).

Anselmo, R.; "Structural Evolution of Veritec's Two–Dimensional, Machine–Readable Symbol;" pp. 1–19; Exhibit 3 introduced on p. 20 of the transcript of the Jul. 17, 2007 deposition of Robert Anselmo taken in the *Cognex v. VCode* litigation.

Sketch titled "Bar Code", 1 page; Exhibit 4 introduced on p. 33 of the transcript of the Jul. 17, 2007 deposition of Robert Anselmo taken in the *Cognex v. VCode* litigation.

Sketch, 1 page; Exhibit 5 introduced on p. 36 of the transcript of the Jul. 17, 2007 deposition of Robert Anselmo taken in the *Cognex v. VCode* litigation.

Sketch, 1 page; Exhibit 6 introduced on p. 66 of the transcript of the Jul. 17, 2007 deposition of Robert Anselmo taken in the *Cognex v. VCode* litigation.

Veritec Vault Inventory by V. Tran, J. Dahl, L. Matthews and H. Behling; Mar. 24, 1999; 1 page; Exhibit 12 introduced on p. 123 of the transcript of the Jul. 17, 2007 deposition of Robert Anselmo taken in the *Cognex v. VCode* litigation Exhibit 45 of Declaration of Kevin Gannon in support of Plaintiff's Motion for Partial Summary Judgment on Count II of its First Supplemental Complaint/Invalidity in the *Cognex v. VCode* litigation.

Declaration of Robert Sant'Anselmo made in Reexamination No. 90/007,980 of Patent No. 5,612,524, signed Jun. 5, 2006 (7 pages) with Proof of Service to S. Kamholz; Jun. 6, 2006; Exhibit 13 introduced on p. 128 of the transcript of the Jul. 17, 2007 deposition of Robert Anselmo taken in the *Cognex v. VCode* litigation.

Sketch, 1 page; Exhibit 14 introduced on p. 140 of the transcript of the Jul. 17, 2007 deposition of Robert Anselmo taken in the *Cognex v. VCode* litigation.

Letter from Patrick L. Dalton to John R. Koza, Scientific Games, Inc. re: new product literature ( 1 page): Visicheck (2 pages), Covert (2 pages) and Vericode (4 pages); Feb. 24, 1986; Exhibit 15 introduced on p. 167 of the transcript of the Jul. 17, 2007 deposition of Robert Anselmo taken in the *Cognex v. VCode* litigation; Exhibit 21 introduced on p. 77 of the transcript of the Jun. 4, 2007 deposition of Patrick Dalton taken in the *Cognex v. VCode* litigation; Exhibit 66 of Declaration of Kevin Gannon in support of Plaintiff's Motion for Partial Summary Judgment on Count II of its First Supplemental Complaint/Invalidity in the *Cognex v. VCode* litigation.

Declaration of Robert Sant'Anselmo made in Patent Application Serial No. 125,616 entitled "Identification Symbol, System and Method," signed Jun. 16, 1988; Exhibit 17 introduced on p. 194 of the transcript of the Jul. 17, 2007 deposition of Robert Anselmo taken in the *Cognex v. VCode* litigation.

Letter from R. Widney to C. Linn, Sep. 3, 1986 (2 pages); Exhibit A of Declaration of Robert Sant'Anselmo of Jun.16, 1988; Exhibit 13 introduced on p. 52 of the transcript of the Jun. 4, 2007 deposition of Patrick Dalton taken in the *Cognex v. VCode* litigation.

Memorandum from RSA to RMS, CSA, PLD, DCH, Oct. 21 1986 (2 pages); Exhibit B of Declaration of Robert Sant'Anselmo of Jun. 16, 1988.

Proposal from Veritec Inc. to Norton & Wright Limited, Nov. 11, 1986 (4 pages) and quotation; Exhibit C of Declaration of Robert Sant'Anselmo of Jun. 16, 1988.

Letter from C. Linn to R. Anselmo, Oct. 23, 1986 (3 pages); Exhibit D of Declaration of Robert Sant'Anselmo of Jun. 16, 1988.

Letter from G. Wilkinson to P. Dalton, Nov. 17, 1986 (1 page); Exhibit E of Declaration of Robert Sant'Anselmo of Jun. 16, 1988.

Specification of Vericode (2 pages); Exhibit F of Declaration of Robert Sant'Anselmo of Jun. 16, 1988.

Memorandum from PLD, DCH to R. Stander, Jul. 13, 1987 re: Summary of activities during installation at Norton & Wright (4 pages); Exhibit G of Declaration of Robert Sant'Anselmo of Jun. 16, 1988; Exhibit 8 introduced on p. 64 of the transcript of the Jul. 14, 2007 deposition of David C. Hooper taken in the *Cognex* v. *VCode* litigation; Exhibit 16 of Declaration of Steven W. Hartsell in support of Defendants' Motion for Partial Summary Judgment on Count II of its First Supplemental Complaint/Invalidity in the *Cognex* v. *VCode* litigation.

Memorandum from RMS to PLD, Sep. 1, 1987 re: Telecon with C. Linn, N&W, Aug. 25, 1987; Exhibit H of Declaration of Robert Sant'Anselmo of Jun. 16, 1988.

Facsimile from P. Dalton to G. Wilkinson, Dec. 15, 1987 re: test run; Exhibit I of Declaration of Robert Sant'Anselmo of Jun. 16, 1988.

Letter from R. Anselmo to D. Priddy re: Vericode Identification System: Vericode (4 pages); Covert (2 pages); Visicheck (2 pages) Jul. 31, 1985; Exhibit 18 introduced on p. 197 of the transcript of the Jul. 17, 2007 deposition of Robert Anselmo taken in the *Cognex* v. *VCode* litigation; Exhibit 4 introduced on p. 24 of the transcript of the Jun. 4, 2007 deposition of Patrick Dalton taken in the *Cognex* v. *VCode* litigation; Exhibit 24 of Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Letter from Howard M. Gitten, Blum Kaplan, to Robert S. Anselmo, Veritec, Inc., re: U.S. Patent No. 4,924,078 and International Data (I.D.) Matrix, Inc.; Dec. 17, 1991; pp. 1–8; Exhibit 29 introduced on p. 237 of the transcript of the Jul. 17, 2007 deposition of Robert Anselmo taken in the *Cognex* v. *VCode* litigation; Exhibit 54 of Declaration of Kevin Gannon in support of Plaintiff's Motion for Partial Summary Judgment on Count II of its First Supplemental Complaint/Invalidity in the *Cognex* v. *VCode* litigation.

Letter from M. Gray to Veritec, Inc. re: photographs taken Apr. 1986 and Jun. 1986; Mar. 30, 1990; 1 page; Exhibit 31 introduced on p. 245 of the transcript of the Jul. 17, 2007 deposition of Robert Anselmo taken in the *Cognex* v. *VCode* litigation.

Goldstein, "Selling Prevention Counterfeits Spell Cash for Veritec;" Los Angeles Times, Feb. 25, 1986; printed newspaper p. 5B; Exhibit 32 introduced on p. 246 of the transcript of the Jul. 17, 2007 deposition of Robert Anselmo taken in the *Cognex* v. *VCode* litigation.

Goldstein, "Selling Prevention Counterfeits Spell Cash for Veritec;" Los Angeles Times, Feb. 25, 1986; document text pp. 1–4; Exhibit 33 introduced on p. 246 of the transcript of the Jul. 17, 2007 deposition of Robert Anselmo taken in the *Cognex* v. *VCode* litigation.

Videotaped Telephonic Deposition of Robert Anselmo, *Cognex Corporation*, Plaintiff, v. *VCode Holdings, Inc., VData LLC, Acacia Research Corporation, and Veritec Inc.*, Defendants, vol. 2; Sep. 11, 2007; pp. 287–382 (25 sheets).

AVS Makeshift Rotatable Drum with Vericode Symbols in a Rigid, Aligned Position. Circa: Mar./Apr. 1986; 1 page (enlarged view); Exhibit 35 introduced on p. 292 of the transcript of the Sep. 11, 2007 deposition of Robert Anselmo taken in the *Cognex* v. *VCode* litigation; Exhibit 11 introduced on p. 60 of the transcript of the Oct. 6, 2007 deposition of Shawn Makanvand taken in the *Cognex* v. *VCode* litigation.

AVS Makeshift Rotatable Drum with Vericode Symbols in a Rigid, Aligned Position. Circa: Mar. 1986; 1 page; Exhibit 36 introduced on p. 320 of the transcript of the Sep. 11, 2007 deposition of Robert Anselmo taken in the *Cognex* v. *VCode* litigation; Exhibit 12 introduced on p. 61 of the transcript of the Oct. 6, 2007 deposition of Shawn Makanvand taken in the *Cognex* v. *VCode* litigation.

Nine pages labeled Test 1B, Test 2B, Test 2C, Test 3A, Test 3B, Test 3C, Test 4B, Test 6A, and Test 6B which is a series of Vericodes which were generated for a test; Exhibit 37 introduced on p. 325 of the transcript of the Sep. 11, 2007 deposition of Robert Anselmo taken in the *Cognex* v. *VCode* litigation.

A sheet of symbols labeled ⅜" Vericodes 1–102 VFR TFP, Exhibit 38 introduced on p. 334 of the transcript of the Sep. 11, 2007 deposition of R. Anselmo taken in the *Cognex* v. *VCode* litigation.

Monthly Status Report; Feb. 1986; pp. 1–6; Exhibit 40 introduced on p. 348 of the transcript of the Sep. 11, 2007 deposition of R. Anselmo taken in the *Cognex* v. *VCode* litigation.

Transcript of videotaped deposition of Patrick Dalton, *Cognex Corporation* vs. *VCode Holdings, Inc., VData LLC, Acacia Research Corporation d/b/a Acacia Technologies Group, and Veritec, Inc.*; Jun.4, 2007; pp. 1–238 (61 sheets).

Letter from P. Dalton to T. McGrath re: Veritec Anti–Counterfeiting Technologies; Feb. 22, 1985; 1 page; Exhibit 2 introduced on p. 17 of the transcript of the Jun. 4, 2007 deposition of Patrick Dalton taken in the *Cognex* v. *VCode* litigation.

Letter from RB to R. Anselmo re: Quantrad and R. Salpietro; May 20, 1985; 1 page; Exhibit 3 introduced on p. 20 of the transcript of the Jun. 4, 2007 deposition of Patrick Dalton taken in the *Cognex* v. *VCode* litigation.

Letter from R. Anselmo to O. Giblin re: technology overview brochure; Aug. 14, 1985; 1 page; Exhibit 5 introduced on p. 36 of the transcript of the Jun. 4, 2007 deposition of Patrick Dalton taken in the *Cognex* v. *VCode* litigation.

Letter from P. Dalton to D. Purcell re: Visicheck, Covert, and Vericode; Aug. 19, 1985; 1 page; Exhibit 6 introduced on p. 37 of the transcript of Jun. 4, 2007 deposition of Patrick Dalton taken in the *Cognex* v. *VCode* litigation; Exhibit 12 of Declaration of Kevin Gannon in support of Plaintiff's Motion for Partial Summary Judgment on Count II of its First Supplemental Complaint/Invalidity in the *Cognex* v. *VCode* litigation.

Letter from Richard M. Widney to Patrick L. Dalton re: employment with Veritec Inc. as National Accounts Sales Manager; Sep. 4, 1985; 1 page; Exhibit 7 introduced on p. 39 of the transcript of the Jun. 4, 2007 deposition of Patrick Dalton taken in the *Cognex* v. *VCode* litigation; Exhibit 13 of Declaration of Kevin Gannon in support of Plaintiff's Motion for Partial Summary Judgment on Count II of its First Supplemental Complaint/Invalidity in the *Cognex* v. *VCode* litigation.

Letter from Patrick L. Dalton to Gerry R. Williams, Ford Motor Company re: paint chips for V.I.N. and Vericode; Sep. 23, 1985; 2 pages; Exhibit 8 introduced on p. 40 of the transcript of the Jun. 4, 2007 deposition of Patrick Dalton taken in the *Cognex* v. *VCode* litigation; Exhibit 16 of Declaration of Kevin Gannon in support of Plaintiff's Motion for Partial Summary Judgment on Count II of its First Supplemental Complaint/Invalidity in the *Cognex* v. *VCode* litigation.

Letter from Patrick L. Dalton to Robert S. Arnold, Chrysler Corporation re: videocassette copy of slide presentation on V.I.N. and Vericode; Sep. 27, 1985; 2 pages; Exhibit 9 introduced on p. 42 of the transcript of the Jun. 4, 2007 deposition of Patrick Dalton taken in the *Cognex* v. *VCode* litigation; Exhibit 17 of Declaration of Kevin Gannon in support of Plaintiff's Motion for Partial Summary Judgment on Count II of its First Supplemental Complaint/Invalidity in the *Cognex* v. *VCode* litigation.

Letter from Richard M. Widney to G.C. Schwartz, General Motors Corporation re: Anticounterfeiting System Request for Quotation, Sep. 13, 1985; 3 pages; Exhibit 10 introduced on p. 43 of the transcript of the Jun. 4, 2007 deposition of Patrick Dalton taken in the *Cognex* v. *VCode* litigation; Exhibit 24 of Declaration of Kevin Gannon in support of Plaintiff's Motion for Partial Summary Judgment on Count II of its First Supplemental Complaint/Invalidity in the *Cognex* v. *VCode*litigation.

Letter from Patrick L. Dalton to Ken Preece, Rolls Royce Motors, Inc. re: videocassette copy of V.I.N. and Vericode, etc.; Oct. 11, 1985; 2 pages; Exhibit 11 introduced on p. 45 of the transcript of the Jun. 4, 2007 deposition of Patrick Dalton taken in the *Cognex* v. *VCode* litigation; Exhibit 18 of Declaration of Kevin Gannon in support of Plaintiff's Motion for Partial Summary Judgment on Count II of its First Supplemental Complaint/Invalidity in the *Cognex* v. *VCode* litigation.

Letter from Patrick L. Dalton to Glen C. Schwartz, General Motors Corporation re: videocassette copy of V.I.N. and Vericode; Oct. 25, 1985; 2 pages; Exhibit 14 introduced on p. 55 of the transcript of the Jun. 4, 2007 deposition of Patrick Dalton taken in the *Cognex* v. *VCode* litigation; Exhibit 20 of Declaration of Kevin Gannon in support of Plaintiff's Motion for Partial Summary Judgment on Count II of its First Supplemental Complaint/Invalidity in the *Cognex* v. *VCode* litigation.

Letter from Patrick L. Dalton to Rudy G. Weyland, Saturn Corporation re: videocassette copy of V.I.N. and Vericode; Feb. 6, 1986; 2 pages; Exhibit 18 introduced on p. 69 of the transcript of the Jun. 4, 2007 deposition of Patrick Dalton taken in the *Cognex* v. *VCode* litigation; Exhibit 22 of Declaration of Kevin Gannon in support of Plaintiff's Motion for Partial Summary Judgment on Count II of its First Supplemental Complaint/Invalidity in the *Cognex* v. *VCode* litigation; Exhibit 28 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Letter from P. Dalton to R. Langley re: General Motors Corporation, Feb. 13, 1986 (1 page), and Letter from P. Dalton to R. Valin re: Visicheck, Covert and Vericode, Feb. 4, 1986 (1 page); Exhibit 19 introduced on p. 73 of the transcript of the Jun. 4, 2007 deposition of Patrick Dalton taken in the *Cognex* v. *VCode* litigation; Exhibit 62 of Declaration of Kevin Gannon in support of Plaintiff's Motion for Partial Summary Judgment on Count II of its First Supplemental Complaint/Invalidity in the *Cognex* v. *VCode* litigation.

Letter from P. Dalton to B. Carrick re: machine vision lab results; Mar. 18, 1996; 2 pages; Exhibit 22 introduced on p. 81 of the transcript of the Jun. 4, 2007 deposition of Patrick Dalton taken in the *Cognex* v. *VCode* litigation.

Letter from Patrick L. Dalton to Philip Koslovsky, PSI Hydraulics Electronics re: product literature and videocassette, Vericode Identification System; Mar. 25, 1986; 1 page; Exhibit 25 introduced on p. 95 of the transcript of the Jun. 4, 2007 deposition of Patrick Dalton taken in the *Cognex* v. *VCode* litigation; Exhibit 23 of Declaration of Kevin Gannon in support of Plaintiff's Motion for Partial Summary Judgment on Count II of its First Supplemental Complaint/ Invalidity in the *Cognex* v. *VCode* litigation.

Letter from Patrick L. Dalton to Gray Bethea, Esq., Scientific Games, Inc., re: Schedule of Proposed Fees; Apr. 7, 1986; 1 page; Schedule of Proposed Fees, 2 pages; Exhibit 26 introduced on p. 97 of the transcript of the Jun. 4, 2007 deposition of Patrick Dalton taken in the *Cognex* v. *VCode* litigation; Exhibit 46 of Declaration of Kevin Gannon in support of Plaintiff's Motion for Partial Summary Judgment on Count II of its First Supplemental Complaint/Invalidity in the *Cognex* v. *VCode* litigation.

Minutes of Regular Meeting of Board of Directors of Veritec Inc. on Apr. 11, 1986; 4 pages; Exhibit 27 introduced on p. 99 of the transcript of Jun. 4, 2007 deposition of Patrick Dalton taken in the *Cognex* v. *VCode* litigation.

Letter from Patrick L. Dalton to William F. Edwards, Jr., Lawrence Livermore National Laboratory Universtiy of California, re: quotation (2 pages) and system specification (7 pages) with drawings (3 pages) for Veritec vision system including Vericode Identification System; May 16, 1986; Exhibit 28 introduced on p. 102 of the transcript of the Jun. 4, 2007 deposition of Patrick Dalton taken in the *Cognex* v. *VCode* litigation; Exhibit A1 from Plaintiff's Invalidity Contentions from the *Cognex* v. *VCode* litigation; Exhibit 31 of Declaration of Kevin Gannon in support of Plaintiff's Motion for Partial Summary Judgment on Count II of its First Supplemental Complaint/Invalidity in the *Cognex* v. *VCode* litigation; Exhibit 11 of Declaration of Steven W. Hartsell in support of Defendants' Motion for Partial Summary Judgment on Count II of its First Supplemental Complaint/Invalidity in the *Cognex* v. *VCode* litigation.

Exhibit 27 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Letter from Patrick L. Dalton to Dr. R.W.F. LePage, Biotechnica Limited re: Vericode, Covert, Visicheck, Jun. 9, 1986; 4 pages; Exhibit 29 introduced on p. 106 of the transcript of the Jun. 4 2007 deposition of Patrick Dalton taken in the *Cognex* v. *VCode* litigation; Exhibit 25 of Declaration of Kevin Gannon in support of Plaintiff's Motion for Partial Summary Judgment on Count II of its First Supplemental Complaint/Invalidity in the *Cognex* v. *VCode* litigation.

Letter from Patrick L. Dalton to Robert Hall, Step Products re: Vericode, Covert, Visicheck; Jun. 10, 1986; 2 pages; Exhibit 30 introduced on p. 107 of the transcript of the Jun. 4, 2007 deposition of Patrick Dalton taken in the *Cognex* v. *VCode* litigation; Exhibit 26 of Declaration of Kevin Gannon in support of Plaintiff's Motion for Partial Summary Judgment on Count II of its First Supplemental Complaint/ Invalidity in the *Cognex* v. *VCode* litigation.

Letter from Patrick L. Dalton to Anderson F. Johnson, Jr., AT&T Technology Systems re: Vericode Identification System and Veriscan; Jun. 11, 1986; 2 pages; Exhibit 31 introduced on p. 107 of the transcript of the Jun. 4, 2007 deposition of Patrick Dalton taken in the *Cognex* v. *VCode* litigation; exhibit 27 of Declaration of Kevin Gannon in support of Plaintiff's Motion for Partial Summary Judgment on Count II of its First Supplemental Complaint/Invalidity in the *Cognex* v. *VCode* litigation; Exhibit 29 of Declaration of Kevin Gannon in support of Plaintiff's Motion for Partial Summary Judgment on Count II of its First Supplemental Complaint/Invalidity in the *Cognex* v. *VCode* litigation.

Letter from Patrick L. Dalton to M. Haptonstall, General Dynamics Corporation re: Vericode, Covert, Visicheck; Jun. 13, 1986; 4 pages; Exhibit 32 introduced on p. 109 of the transcript of the Jun. 4, 2007 deposition of Patrick Dalton taken in the *Cognex* v. *VCode* litigation; Exhibit 28 of Declaration of Kevin Gannon in support of Plaintiff's Motion for Partial Summary Judgment on Count II of its First Supplemental Complaint/Invalidity in the *Cognex* v. *VCode* litigation.

Memorandum from P. Dalton to RMS, RSA, RMW re: Product Development Info for the Vericode System (1 page); Jul. 8, 1986 with Data Translation brochure (2 pages); Exhibit 33 introduced on p. 111 of the transcript o the Jun. 4, 2007 deposition of Patrick Dalton taken in the *Cognex* v. *VCode* litigation.

Letter from P. Dalton to S. Burnham re: 5 wafers sample Vericode laser–marking; Jul. 10, 1986; 1 page; Exhibit 34 introduced on p. 113 of the transcript of the Jun. 4, 2007 deposition of Patrick Dalton taken in the *Cognex* v. *VCode* litigation.

Letter from P. Dalton to Anderson F. Johnson, Jr., AT&T Technology Systems re: AT&T purchase order; Jul. 11, 1986; 2 pages; Exhibit 35 introduced on p. 122 of the transcript of the Jun. 4, 2007 deposition of Patrick Dalton taken in the *Cognex* v. *VCode* litigation.

Letter from Patrick L. Dalton to Christine Fleming, Find–SVP re: Vericode, Covert, Visicheck; Aug. 4, 1986; 3 pages; Exhibit 36 introduced on p. 127 of the transcript of the Jun. 4, 2007 deposition of Patrick Dalton taken in the *Cognex* v. *VCode* litigation; Exhibit 29 of Declaration of Kevin Gannon in support of Plaintiff's Motion for Partial Summary Judgment on Count II of its First Supplemental Complaint/Invalidity in the *Cognex* v. *VCode* litigation.

Letter from Patrick L. Dalton to Elaine Merritt, Fischer Scientific Company, Inc. re: Vericode; Aug. 4, 1986; 2 pages; Exhibit 37 introduced on p. 129 of the transcript of the Jun. 4, 2007 deposition of Patrick Dalton taken in the *Cognex* v. *VCode* litigation; Exhibit 30 of Declaration of Kevin Gannon in support of Plaintiff's Motion for Partial Summary Judgment on Count II of its First Supplemental Complaint/ Invalidity in the *Cognex* v. *VCode* litigation.

Letter from Patrick L. Dalton to Colin H. Linn, Esq. Norton & Wright Limited, re: proposal and quotation; Nov. 11, 1986, 1 page; Proposal, 4 pages; Quotation, 2 pages; Exhibit 38 introduced on p. 135 of the transcript of the Jun. 4, 2007 deposition of Patrick Dalton taken in the *Cognex* v. *VCode* litigation; Exhibit A2 from Plaintiff's Invalidity Contentions from the *Cognex* v. *VCode* litigation; Exhibit 15 of Declaration of Kevin Gannon in support of Plaintiff's Motion for Partial Summary Judgment on Count II of its First Supplemental Complaint/Invalidity in the *Cognex* v. *VCode* litigation; Exhibit 32 of Declaration of Kevin Gannon in support of Plaintiff's Motion for Partial Summary Judgment on Count II of its First Supplemental Complaint/Invalidity in the *Cognex* v. *VCode* litigation;

Exhibit 15 of Declaration of Steven W. Hartsell in support of Defendants' Motion for Partial Summary Judgment on Count II of its First Supplemental Complaint/Invalidity in the *Cognex* v. *VCode litigation*.

System Description from Veritec Inc. to Prime Automation (2 pages) and price quotation (1 page); Sep. 15, 1986; Exhibit 39 introduced on p. 140 of the transcript of the Jun. 4, 2007 deposition of Patrick Dalton taken in the *Cognex* v. *VCode* litigation.

Notes by P. Dalton re: Saturn meeting with Priddy, SAIC/ HALL, WM; Sep. 5, 1986; 2 pages; Exhibit 40 introduced on p. 142 of the transcript of the Jun. 4, 2007 deposition of Patrick Dalton taken in the *Cognex* v. *VCode* litigation.

Facsimile from C. Anselmo to R. Anselmo / R. Stander with Memorandum from C. Anselmo to R. Anselmo re: Tom Turner Meeting and The Vericode Algorithm for Encryption of a Matrix Identifier (7 pages); Sep. 30, 1986; Exhibit 42 introduced on p. 149 of the transcript of the Jun. 4, 2007 deposition of Patrick Dalton taken in the *Cognex* v. *VCode* litigation.

Letter from P. Dalton to P. Hogan re: Vision '86 Show and Vericode; Oct. 22 1986; 3 pages; Exhibit 44 introduced on p. 153 of the transcript of the Jun. 4, 2007 deposition of Patrick Dalton taken in the *Cognex* v. *VCode* litigation.

Letter from P. Dalton to D. Ashendorf re: Vericode system; Oct. 30, 1986; 1 page; Exhibit 45 introduced on p. 156 of the transcript of the Jun. 4, 2007 deposition of Patrick Dalton taken in the *Cognex* v. *VCode* litigation.

Programming code for Vericode; May 25, 1987; 20 pages; Exhibit 46 introduced on p. 171 of the transcript of the Jun. 4, 2007 deposition of Patrick Dalton taken in the *Cognex* v. *VCode* litigation; Exhibit 12 introduced on p. 57 of the transcript of the Jun. 5, 2007 deposition of Louis S. Leopold taken in the *Cognex* v. *VCode* litigation.

Transcript of videotaped deposition of David Christopher Hooper, *Cognex Corporation* vs. *VCode Holdings, Inc., et al*; Jul. 14, 2007; p. 1–142 (37 sheets).

Memorandum from RMS to CSA, PLD, cc: Interview for D. Hooper; Aug. 14, 1986; 1 page; Exhibit 2 introduced on p. 22 of the transcript of the Jul. 14, 2007 deposition of David C. Hooper taken in the *Cognex* v. *VCode* litigation.

SAIC/Veritec Agenda; Sep. 16, 1986; 1 page; Exhibit 4 introduced on p. 34 of the transcript of the Jul. 14, 2007 deposition of David C. Hooper taken in the *Cognex* v. *VCode* litigation.

Notes on SAIC trip re: IBM/Intel Hardware, search algorithm and non-contact Vericode finding; Oct. 29, 1986; 1 page; Exhibit 5 introduced on p. 36 of the transcript of the Jul. 14, 2007 deposition of David C. Hooper taken in the *Cognex* v. *VCode* litigation; Exhibit 65 of Declaration of Kevin Gannon in support of Plaintiff's Motion for Partial Summary Judgment on Count II of its First Supplemental Complaint/Invalidity in the *Cognex* v. *VCode* litigation.

Memorandum from RSA to RMS, CC: JLK, PLD JCB, DCH re: C. Linn, Norton & Wright Ltd.; Sep. 30, 1986; 1 page; Exhibit 6 introduced on p. 46 of the transcript of the Jul. 14, 2007 deposition of David C. Hooper taken in the *Cognex* v. *VCode* litigation.

Memorandum from D. Hooper to G. Wilkinson re: Status Report on extensive lighting studies; Mar. 4, 1987; 13 pages; Exhibit 7 introduced on p. 61 of the transcript of the Jul. 14, 2007 deposition of David C. Hooper taken in the *Cognex* v. *VCode* litigation.

Memorandum from L. Leopold to PLD, RMS, DCH, RSA re: Norton & Wright System Software Programming; Mar. 26, 1987; 1 page; Exhibit 9 introduced on p. 71 of the transcript of the Jul. 14, 2007 deposition of David C. Hooper taken in the *Cognex* v. *VCode* litigation; Exhibit 10 introduced on p. 43 of the transcript of the Jun. 5, 2007 deposition of Louis S. Leopold taken in the *Cognex* v. *VCode* litigation; Exhibit 44 of Declaration of Kevin Gannon in support of Plaintiff's Motion for Partial Summary Judgment on Count II of its First Supplemental Complaint/Invalidity in the *Cognex* v. *VCode* litigation.

Memorandum from D. Hooper to J. Wingard cc RMS, PLD, CSA re: Software module availability and use; Nov. 11, 1987; 2 pages; Exhibit 10 introduced on p. 74 of the transcript of the Jul. 14 2007 deposition of David C. Hooper taken in the *Cognex* v. *VCode* litigation.

Sant'Anselmo et al.; "Identification Symbol, System and Method" Specification, p. 1–21; Programming code for Vericode; May 15, 1987; 20 pages; Drawings (19 pages); Exhibit 14 introduced on p. 94 of the transcript of the Jul. 14, 2007 deposition of David C. Hooper taken in *Cognex* v. *VCode* litigation; Exhibit 21 of Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Programming code for Vericode; Dec. 18, 1987; 11 pages; Exhibit 15 introduced on p. 106 of the transcript of the Jul. 14, 2007 deposition of David C. Hooper taken in the *Cognex* v. *VCode* litigation.

Memorandum from RSA to PLD, DCH cc RMS re: Meeting with DHI; Dec. 3, 1986; 1 page; Exhibit 16 introduced on p. 113 of the transcript of the Jul. 14, 2007 deposition of David C. Hooper taken in the *Cognex* v. *VCode* litigation.

Transcript of videotaped deposition of Louis S. Leopold, *Cognex Corporation* vs. *VCode Holdings, Inc., VData, LLC, Acacia Research Corporation d/b/a Acacia Technologies Group, and Veritec, Inc.*; Jun. 5, 2007; pp. 1–82 (22 sheets).

Veriscan 4000 Programs & Documentation, System Specification for the Veriscan 4000 Identification System (Beta Version); Apr. 23, 1987; 178 pages; Exhibit 2 introduced on p. 17 of the transcript of the Jun. 5, 2007 deposition of Louis S. Leopold taken in the *Cognex* v. *VCode* litigation.

Veriscan 4000 Identification System Operator's Manual; Apr. 27, 1987; 37 pages; Exhibit 3 introduced on p. 17 of the transcript of the Jun. 5, 2007 deposition of Louis S. Leopold taken in the *Cognex* v. *VCode* litigation.

Front face of Floppy disk of Veritec Software Backup #1; Exhibit 4 introduced on p. 17 of the transcript of the Jun. 5, 2007 deposition of Louis S. Leopold taken in the *Cognex* v. *VCode* litigation.

Front face of Floppy disk of Veritec Software Backup Disk #1; Exhibit 5 introduced on p. 17 of the transcript of the Jun. 5, 2007 deposition of Louis S. Leopold taken in the *Cognex* v. *VCode* litigation.

Front face of Floppy disk of Veritec 4000 Job Database Source Code, Veriscan System SPSC Backup Format (4/10); Exhibit 6 introduced on p. 17 of the transcript of the Jun. 5, 2007 deposition of Louis S. Leopold taken in the *Cognex* v. *VCode* litigation.

Front face of Floppy disk of Veritec Software Backup Disk #2; Exhibit 7 introduced on p. 17 of the transcript of the Jun. 5, 2007 deposition of Louis S. Leopold taken in the *Cognex* v. *VCode* litigation.

Front face of Floppy disk of Veritec Software Backup Disk #3; Exhibit 8 introduced on p. 17 of the transcript of the Jun. 5, 2007 deposition of Louis S. Leopold taken in the *Cognex* v. *VCode* litigation.

Computer Program Code, "Procedure to Trigger the Relay"; Mar. 31, 1987; 2 pages; Exhibit 9 introduced on p. 39 of the transcript of the Jun. 5, 2007 deposition of Louis S. Leopold taken in the *Cognex* v. *VCode* litigation.

Memorandum from L. Leopold to R. Stander, P. Dalton, R. Anselmo, D. Hooper re: Vericode Print Program Specification; Apr. 17, 1987; 2 pages; Exhibit 11 introduced on p. 50 of the transcript of the Jun. 5, 2007 deposition of Louis S. Leopold taken in the *Cognex* v. *VCode* litigation.

Transcript from the deposition of Shawn Makanvand, *Cognex Corporation, Plaintiff,* v. *VCode Holdings, Inc., VData LLC, Acacia Research Corporation, and Veritec Inc.*, Defendants, Oct. 6, 2007; pp. 1–105 (27 sheets); Exhibit C of Declaration of Edward E. Casto, Jr. in Support of Defendants' Opposition to Plaintiff's Motion to Dismiss, or Alternatively, for a Preclusion Order, due to Defendants's Spoliation of Evidence in the *Cognex* v. *VCode* litigation.

Memorandum from R.M. Stander to RSA, CSA, RMW re: Meeting with Advanced Vision Systems, Inc.; Nov. 13, 1985; 1 page; Exhibit 1 introduced on p. 29 of the transcript of the Oct. 6, 2007 deposition of Shawn Makanvand taken in the *Cognex* v. *VCode* litigation; Exhibit 2 of Declaration of Kevin Gannon in support of Plaintiff's Motion for Partial Summary Judgment on Count II of its First Supplemental Complaint/Invalidity in the *Cognex* v. *VCode* litigation.

3 Checks from Veritec, Inc. to Advanced Vision Systems, Inc. Exhibit 2 introduced on p. 32 of the transcript of the Oct. 6, 2007 deposition of Shawn Makanvand taken in the *Cognex* v. *VCode* litigation. The checks are $18,000.00 Down payment for a video/optical scanning and processing system including all software and hardware components for said system; Jan. 23, 1986; $18,000.00 2nd payment on VOSPS equipment, Feb. 24, 1986; $18,000.00 3rd payment on VOSPS equipment, Mar. 7, 1986.

Specification, facsimile transmitted Feb. 17, 1986; pp. 1–14; Exhibit 4 introduced on p. 40 of the transcript of the Oct. 6, 2007 deposition of Shawn Makanvand taken in the *Cognex* v. *VCode* litigation.

Specification: Video/Optical Scanning and Processing System (VOSPS), Veritec, Inc., Jun. 6, 1985, 8 pages; Exhibit 5 introduced on p. 42 of the transcript of the Oct. 6, 2007 deposition of Shawn Makanvand taken in the *Cognex* v. *VCode* litigation; Exhibit 1 of Declaration of Kevin Gannon in support of Plaintiff's Motion for Partial Summary Judgment on Count II of its First Supplemental Complaint/Invalidity in the *Cognex* v. *VCode* litigation.

Memorandum Agreement between Veritec Inc. and Advanced Vision Systems, Inc. on Jan. 23, 1986, 3 pages, with Specification, Jan. 27, 1986, pp. 1–12; Exhibit 6 introduced on p. 43 of the transcript of the Oct. 6, 2007 deposition of Shawn Makanvand taken in the *Cognex* v. *VCode* litigation.

Letter from Robert M. Stander to Majid Amini, Advanced Vision Systems, Inc.; Feb. 11, 1986 (1 page) and Amendment No. 1 to Memorandum Agreement (3 pages); Jan. 23, 1986; Exhibit 7 introduced on p. 49 of the transcript of the Oct. 6, 2007 deposition of Shawn Makanvand taken in the *Cognex* v. *VCode* litigation.

Check from Veritec, Inc. to Advanced Vision Systems, Inc. for $2,288.25 for Invoice #10140—Payment for Exhibition show Vision '86; Apr. 28, 1986; and Invoice #10140; Exhibit 8 introduced on p. 51 of the transcript of the Oct. 6, 2007 deposition of Shawn Makanvand taken in the *Cognex* v. *VCode* litigation.

Check from Veritec, Inc. to Advanced Vision Systems, Inc. for $16,771.00 and Invoice #10138—Final Payment on VOSPS Equipment; Apr. 16, 1986 and Invoice #10138; Exhibit 9 introduced on p. 53 of the transcript of the Oct. 6, 2007 deposition of Shawn Makanvand taken in the *Cognex* v. *VCode* litigation.

Check from Veritec, Inc. to Advanced Vision Systems, Inc. for $3,562.00 for 50% as deposit on Option I—Hand Held Camera Station as Outlined in quote dated Apr. 29, 1986; May 1, 1986; Letter from Peggy Stevens, AVS to Bob Stander re: revised quotation for Option 1; Apr. 29, 1986; Option I quotation (2 pages); Exhibit 10 introduced on p. 55 of the transcript of the Oct. 6, 2007 deposition of Shawn Makanvand taken in the *Cognex* v. *VCode* litigation.

Memorandum from R.S. Anselmo to Carl Anselmo re: Peggy from AVS called, waiting for final test Vericodes to be provided; Feb. 24, 1986; 1 page; Exhibit 13 introduced on p. 64 of the transcript of the Oct. 6, 2007 deposition of Shawn Makanvand taken in the *Cognex* v. *VCode* litigation.

Procedure to Read a Vericode In Any Orientation; pp. A1–A20, May 25, 1987; Exhibit 15 introduced on p. 68 of the transcript of the Oct. 6, 2007 deposition of Shawn Makanvand taken in the *Cognex* v. *VCode* litigation.

Plaintiff Cognex Corporation's Invalidity Contentions Regarding U.S. Patent 5,612,524 from the *Cognex* v. *VCode* litigation; dated Aug. 16, 2007.

Defendants' Response to Cognex's Invalidity Contentions Regarding U.S. Patent No. 5,612,524 from the *Cognex* v. *VCode* litigation; dated Sep. 14, 2007.

Vericode Identification System brochure; 4 pages; Exhibit F from Aug. 16, 2007 Plaintiff's Invalidity Contentions from the *Cognex* v. *VCode* litigation.

Jedamus, "Cracking Down on Counterfeits," Newsweek; Apr. 21 1986; p. 3; Exhibit H from Plainfiff's Invalidity Contentions from the *Cognex* v. *VCode* litigation; Exhibit 61 of Declaration of Kevin Gannon in support of Plaintiff's Motion for Partial Summary Judgment on Count II its First Supplemental Complaint/Invalidity in the *Cognex* v. *VCode* litigation.

Cockel, "Magnetic stripes' benefits not seen anywhere else," "Is it fresh? LifeLines tells," "When bar coding can't fit the real estate;"Automatic I.D. News; Oct. 1986; pp. 1 and 18; Exhibit I from Plaintiff's Invalidity Contentions from the *Cognex* v. *VCode* litigation.

Claim Construction Order, *Cognex Corporation*, Plaintiff, v. *VCode Holdings, Inc., VData LLC, Acacia Research Corporation, and Veritec Inc.*, Defendants; Oct. 9, 2007, pp. 1–17.

Plaintiff's Motion to Dismiss, or Alternatively, for a Preclusion Order, Due to Defendants' Spoliation of Evidence, *Cognex Corporation*, Plaintiff, v. *VCode Holdings, Inc., VData LLC, Acacia Research Corporation, and Veritec Inc.*, Defendants; Oct. 27, 2007; pp. 1–2.

Plaintiff's Memorandum in Support of its Motion to Dismiss, or Alternatively, for a Preclusion Order, due to Defendants' Spoliation of Evidence, *Cognex Corporation*, Plaintiff, v. *VCode Holdings, Inc., VData LLC, Acacia Research Corporation, and Veritec Inc.*, Defendants; Oct. 26, 2007; pp. 1–17.

Declaration of Peter G. Nikolai, *Cognex Corporation*, Plaintiff, v. *VCode Holdings, Inc., VData LLC, Acacia Research Corporation, and Veritec Inc.*, Defendants; Oct. 26, 2007; pp. 1–2.

Plaintiff's Motion for Partial Summary Judgment on Count III of its First Supplemental Compliant/Unenforceability in the *Cognex* v. *VCode* litigation; *Cognex Corporation*, Plaintiff, v. *VCode Holdings, Inc., VData LLC, Acacia Research Corporation, and Veritec Inc.*, Defendants; Oct. 26, 2007, pp. 1–2.

Plaintiff's Memorandum in Support of its Motion for Partial Summary Judgment on Count III of its Supplemental Complaint/Unenforceability in the *Cognex* v. *VCode* litigation, *Cognex Corporation*, Plaintiff, v. *VCode Holdings, Inc., VData LLC, Acacia Research Coporation, and Veritec Inc.*, Defendants, Oct. 26, 2007; pp. 1–21.

Declaration of R. Carl Moy; *Cognex Corporation*, Plaintiff, v. *VCode Holdings, Inc., VData LLC, Acacia Research Corporation, and Veritec Inc.*, Defendants; Oct. 26, 2007; pp. 1–13.

Plaintiff's Motion for Partial Summary Judgment on Count II of its First Supplemental Complaint/Invalidity, *Cognex Corporation*, Plaintiff, v. *VCode Holdings, Inc., VData LLC, Acacia Research Corporation, and Veritec Inc.*, Defendants; Oct. 26, 2007; pp. 1–2.

Plaintiff's Memorandum in Support of its Motion for Partial Summary on Count II of its First Supplemental Complaint/Invalidity, *Cognex Corporation*, Plaintiff, v. *VCode Holdings, Inc., VData LLC, Acacia Research Corporation, and Veritec Inc.*, Defendants; Oct. 26, 2007; pp. 1–30.

Declaration of David C. Allais, Ph.D. in Support of Plaintiff's Motion for Partial Summary Judgment of Count II of its First Supplemental Complaint/Invalidity from the *Cognex* v. *VCode* litigation; dated Oct. 24, 2007.

Chart of Asserted Claims in U.S. Patent 5,612,524 Compared with Offers for Sale and Information Prior to the Critical Date, pp. 1–5; Exhibit 3 of Oct. 24, 2007 Declaration of David C. Allais, Ph.D. in Support of Plaintiff's Motion for Partial Summary Judgment of Count II of Its First Supplemental Complaint/Invalidity in the *Cognex* v. *VCode* litigation; Exhibit 4 of Sep. 28, 2007 Opening Expert Report of David C. Allais in the *Cognex* v. *VCode* litigation . . . .

Anticipation of the Asserted Claims of U.S. Patent 5,612,524 Based on Veritec Brochure, pp. 1–12; Exhibit 4 of Oct. 24, 2007 Declaration of David C. Allais, Ph.D. in Support of Plaintiff's Motion for Partial Summary Judgment of Count II of Its First Supplemental Complaint/Invalidity in the *Cognex* v. *VCode* litigation; Exhibit 4 of Sep. 28, 2007 Opening Expert Report of David C. Allais in the *Cognex* v. *VCode* litigation; Exhibit 5 of Opening Expert Report of David C. Allais in the *Cognex* v. *VCode* litigation.

Anticipation of the Asserted Claims of U.S. Patent 5,612,524 Based on Published Japan Patent Application 60–27074 published Feb. 12, 1985, pp. 1–15; Exhibit 5 of Oct. 24, 2007 Declaration of David C. Allais, Ph.D. in Support of Plaintiff's Motion for Partial Summary Judgment of Count II of Its First Supplemental Complaint/Invalidity in the *Cognex* v. *VCode* litigation.

Anticipation of the Asserted Claims of U.S. Patent 5,612,524 Based on Published Japan Patent Application 61–65375 published Apr. 3, 1986; pp. 1–16; Exhibit 6 of Declaration of Oct. 24, 2007 David C. Allais, Ph.D. in Support of Plaintiff's Motion for Partial Summary Judgment of Count II of Its First Supplemental Complaint/Invalidity in the *Cognex* v. *VCode* litigation.

Declaration of Kevin Gannon in Support of Plaintiff's Motion for Partial Summary Judgment on Count II of its First Supplemental Complaint/Invalidity, *Cognex Corporation*, Plaintiff, v. *VCode Holdings, Inc., VData LLC, ACacia Research Corporation, and Veritec Inc.*, Defendants; Oct. 26, 2007; pp. 1–12.

Excerpts of the transcript from the deposition of Shawn Makanvand, *Cognex Corporation*, Plaintiff, v. *VCode Holdings, Inc., VData LLC, Acacia Research Corporation, and Veritec Inc.*, Defendants; Oct. 6, 2007, pp. 1, 13–16, 18–27, 65–68, 72–73, 85–85; Exhibit 3 of Declaration of Kevin Gannon in support of Plaintiff's Motion for Partial Summary Judgment on Count II of its First Supplemental Complaint/Invalidity in the *Cognex* v. *Vcode* litigation.

Veritec Inc., Form 10–K Annual report pursuant to section 13 or 15(d) of the Securities Exchange Act of 1934 for the Fiscal Year ended Jun. 30, 1986, Veritec Inc., Sep. 24, 1986; pp. 1, 4, 11–12, 34; Exhibit 7 of Declaration of Kevin Gannon in support of Plaintiff's Motion for Partial Summary Judgment on Count II of its First Supplemental Complaint/Invalidity in the *Cognex* v. *VCode* litigation.

Excerpts of the Videotaped Telephonic Deposition of Robert Anselmo, *Cognex Corporation*, Plaintiff, v. *VCode Holdings, Inc., VData LLC, Acacia Research Corporation, and Veritec Inc.*, Defendants; Sep. 11, 2007; pp. 1, 305–306, 317 and 322; Exhibit 8 of Declaration of Kevin Gannon in support of Plaintiff's Motion for Partial Summary Judgment on Count II of its First Supplemental Complaint/Invalidity in the *Cognex* v. *VCode* litigation.

Excerpts of the Deposition of Patrick L. Dalton; *Veritec, Inc.*, Plaintiff, v. *International Data Matrix, Inc., Dennis G. Priddy, Stephen M. Wagman, and Robert S. Cymbalski*, Defendants; Jun. 21, 1993; pp. 1, 169–173, 178–179, 181; Exhibit 9 of Declaration of Kevin Gannon in support of Plaintiff's Motion for Partial Summary Judgment on Count II of its First Supplemental Complaint/Invalidity in the *Cognex* v. *VCode* litigation.

Excerpts of the Deposition of Robert Anselmo; *Veritec, Inc.*, Plaintiff, v. *International Data Matrix, Inc., Dennis G. Priddy, Stephen M. Wagman, and Robert S. Cymbalski*, Defendants; Feb. 11, 1993; pp. 1 184–187, 190; Exhibit 10 of Declaration of Kevin Gannon in support of Plaintiff's Motion for Partial Summary Judgment on Count II of its First Supplemental Complaint/Invalidity in the *Cognex* v. *VCode* litigation.

Excerpts of the Deposition of Patrick L. Dalton; *Veritec, Inc.*, Plaintiff, v. *International Data Matrix, Inc., Dennis G. Priddy, Stephen M. Wagman, and Robert S. Cymbalski*, Defendants; Jul. 8, 1993; pp. 465, 540, 543–544; Exhibit 11 of Declaration of Kevin Gannon in support of Plaintiff's Motion for Partial Summary Judgment on Count II of its First Supplemental Complaint/Invalidity in the *Cognex* v. *VCode* litigation.

Excerpts of the Videotaped Deposition of Patrick Dalton; *Cognex Corporation*, Plaintiff, v. *VCode Holdings, Inc., VData LLC, Acacia Research Corporation d/b/a Acacia Technologies Group, and Veritec, Inc.*, Defendants; Jun. 4, 2007; pp. 1, 40–42, 45–47, 93–94, 132–137, 203, 207–208, 210–211, 214–216; Exhibit 14 of Declaration of Kevin Gannon in support of Plaintiff's Motion for Partial Summary Judgment on Count II of its First Supplemental Complaint/Invalidity in the *Cognex* v. *VCode* litigation.

Excerpts of the Videotaped Deposition of Louis S. Leopold, *Cognex Corporation*, Plaintiff, v. *VCode Holdings, Inc., VData LLC, Acacia Research Corporation d/b/a Acacia Technologies Group and Veritec Inc.*, Defendants; Jun. 5, 2007; pp. 1, 9–11, 37–38; Exhibit 33 of Declaration of Kevin Gannon in support of Plaintiff's Motion for Partial Summary Judgment on Count II of its First Supplemental Complaint/Invalidity in the *Cognex* v. *VCode* litigation.

Veriscan 4000 Identification System Operator's Manual; Veritec inc.; Apr. 30, 1987; pp. 1–7; Exhibit 34 of Declaration of Kevin Gannon in support of Plaintiff's Motion for Partial Summary Judgment on Count II of its First Supplemental Complaint/Invalidity in the *Cognex* v. *VCode* litigation.

Memorandum from C.S. Anselmo to Bob Anselmo re: Specification for G.R.; Feb. 18, 1986; 1 page; Specification, pp. 1–14; Exhibit 35 of Declaration of Kevin Gannon in support of Plaintiff's Motion for Partial Summary Judgment on Count II of its First Supplemental Complaint/Invalidity in the *Cognex* v. *VCode* litigation.

Defendant Veritec Inc.'s Response to Plaintiff's First Set of Requests for Admission, *Cognex Corporation*, Plaintiff, v. *VCode Holdings, Inc., VData LLC, Acacia Research Corporation d/b/a Acacia Technologies Group and Veritec Inc.*, Defendants; Aug. 3, 2007; pp. 1, 5–12, 37–39; Exhibit 42 of Declaration of Kevin Gannon in support of Plaintiff's Motion for Partial Summary Judgment on Count II of its First Supplemental Complaint/Invalidity in the *Cognex* v. *VCode* litigation.

Excerpts of the Videotaped Deposition of David Christopher Hooper, *Cognex Corporation*, Plaintiff, v. *VCode Holding, Inc., et al.*, Defendants; Jul. 14, 2007; pp. 1, 21–22; Exhibit 43 of Declaration of Kevin Gannon in support of Plaintiff's Motion for Partial Summary Judgment on Count II of its First Supplemental Complaint/ Invalidity in the *Cognex* v. *VCode* litigation.

Letter from Kevin Gannon, Cesari and McKenna, LLP, to Edward E. Castro, Jr., Esq., Friedman, Suder & Cooke, re: Cognex outstanding discovery issues; Aug. 1, 2007; 2 pages; Exhibit 47 of Declaration of Kevin Gannon in support of Plaintiff's Motion for Partial Summary Judgment on Count II of its First Supplemental Complaint/Invalidity in the *Cognex* v. *VCode* litigation.

Letter from Howard Stern, RVSI, to Stefen Halliday, AIM, Inc., re: Veritec, Inc. patent license; Dec. 5, 2001; 3 pages; Exhibit 51 of Declaration of Kevin Gannon in support of Plaintiff's Motion for Partial Summary Judgment on Count II of its First Supplemental Complaint/Invalidity in the *Cognex* v. *VCode* litigation.

Verified Complaint, *Veritec, Inc.*, Plaintiff, v. *Robotic Vision Systems, Inc.*, Defendant; Mar. 20, 2003; pp. 1, 3–4, 11; Exhibit 52 of Declaration of Kevin Gannon in support of Plaintiff's Motion for Partial Summary Judgment on Count II of its First Supplemental Complaint/Invalidity in the *Cognex* v. *VCode* litigation.

Exclusive License Agreement between Veritec, Inc., VCode Holdings, Inc., and VData LLC; Nov. 21, 2003; pp. 1, 11; Exhibit 53 of Declaration of Kevin Gannon in support of Plaintiff's Motion for Partial Summary Judgment on Count II of its First Supplemental Complaint/Invalidity in the *Cognex* v. *VCode* litigation.

Selected Documents from the File History of U.S. Patent No. 4,924,078, U.S. Appl. No. 07/125,616 cover; Combined Declaration / Power of Attorney for Patent Application; Information Disclosure Statement; Form PTO–1449 (3 pages); Statement Under 37 C.F.R. 1.56; Notice of Allowability; Examiner Interview Summary Record; Notice of Allowance and Issue Fee Due; Statement Under 37 C.F.R. 1.56, 1.99; Supplemental Notice of Allowability; Notice of Referneces Cited; Exhibit 55 of Oct. 26, 2007Declaration of Kevin Gannon in support of Plaintiff's Motion for Partial Summary Judgment on Count II of its First Supplemental Complaint/Invalidity in the *Cognex* v. *VCode* litigation.

Presentation prepared Expressly for Saturn Corporation by Veritec; 10 pages; Exhibit 56 of Declaration of Kevin Gannon in support of Plaintiff's Motion for Partial Summary Judgment on Count II of its First Supplemental Complaint/ Invalidity in the *Cognex* v. *VCode* litigation.

Declaration of Robert Sant'Anselmo for Patent Application Serial No. 306,212; May 31, 1989; 2 pages; 4 pages photographs; Exhibit 57 of Declaration of Kevin Gannon in support of Plaintiff's Motion for Partial Summary Judgment on Count II its First Supplemental Complaint/Invalidity in the *Cognex* v. *VCode* litigation.

Public Gaming Magazine "Veritec Inc." Jul. 1986, pp. 76–77; Exhibit 63 of Declaration of Kevin Gannon in support of Plaintiff's Motion for Partial Summary Judgment on Count II of its First Supplemental Complaint/Invalidity in the *Cognex* v. *VCode* litigation.

"Fakebusters: How Technology Spots Counterfiets" Popular Science, Apr. 1986; pp. 102–104, 125–126; Exhibit 64 of Declaration of Kevin Gannon in support of Plaintiff's Motion for Partial Summary Judgment on Count II of its First Supplemental Complaint/Invalidity in the *Cognex* v. *VCode* litigation.

Excerpts of the Videotaped Deposition of J. Randall Beckers, *Cognex Corporation*, Plaintiff, v. *VCode Holdings, Inc., VData LLC, Acacia Research Corporation, and Veritec Inc.*, Defendants; Jul. 24, 2007; pp. 1, 61–62, 81, 109–110, 115–118, 128–130, 147, 182–183; Exhibit 67 of Declaration of Kevin Gannon in support of Plaintiff's Motion for Partial Summary Judgment on Count II of its First Supplemental Complaint/Invalidity in the *Cognex* v. *VCode* litigation.

Memorandum in Support of Defendants' Motion for Summary Judgment of Dismissal of Plaintiff's Count One for Patent Infringement on the Basis that Plaintiff's Patent in Suit is Unenforceable and For an Award of Attorneys' Fees, *Veritec Inc.*, Plaintiff, v. *International Data Matrix, Inc., Dennis G. Priddy, Stephen M. Wagman, Rogert S. Cymbalski*, Defendants; Apr. 13, 1994; p. i–iii, 1–2; Exhibit 69 of Declaration of Kevin Gannon in support of Plaintiff's Motion for Partial Summary Judgment on Count II of its First Supplemental Complaint/Invalidity in the *Cognex* v. *VCode* litigation.

Haroney; "Graphing Quadric Surfaces: Methods of simulating 3–D graphics on a color display in Basic"; Byte; Dec. 1986; pp. 215–224; Exhibit 70 of Declaration of Kevin Gannon in support of Plaintiff's Motion for Partial Summary Judgment on Count II of its First Supplemental Complaint/ Invalidity in the *Cognex* v. *VCode* litigation.

Office Action for U.S. Appl. No. 07/013,026 dated Aug. 3, 1988; pp. 1–4; Notice of References Cited, 1 page; Exhibit 71 of Declaration of Kevin Gannon in support of Plaintiff's Motion for Partial Summary Judgment on Count II of its First Supplemental Complaint/Invalidity in the *Cognex* v. *VCode* litigation.

Facsimile from Carl S. Anselmo to Robert Anselmo re: comments on patent Examiner's comments; Jul. 21, 1993; cover and pp. 1–4; Exhibit 72 of Declaration of Kevin Gannon in support of Plaintiff's Motion for Partial Summary Judgment on Count II of its First Supplemental Complaint/Invalidity in the *Cognex* v. *VCode* litigation.

Facsimile from Bob Anselmo to Carl Anselmo re: Patent Enhancement; cover and 54 pages; dated Nov. 3, 1987; Exhibit 73 of Declaration of Kevin Gannon in support of Plaintiff's Motion for Partial Summary Judgment on Count II of its First Supplemental Complaint/Invalidity in the *Cognex* v. *VCode* litigation.

Defendants' Opposition to Plaintiff's Motion to Dismiss, or Alternatively, for a Preclusion Order, due to Defendants' Spoliation of Evidence; *Cognex Corporation*, Plaintiff, v. *VCode Holdings, Inc., VData LLC, Acacia Research Corporation, and Veritec Inc.*, Defendants; Nov. 19, 2007.

Declaration of Edward E. Casto, Jr. in Support of Defendants' Opposition to Plaintiff's Motion to Dismiss, or Alternatively, for a Preclusion Order, due to Defendants' Spoliation of Evidence; *Cognex Corporation*, Plaintiff, v. *VCode Holdings, Inc., VData LLC, Acacia Research Corporation, and Veritec Inc.*, Defendant; Nov. 12, 2007.

Excerpts of the Transcript of Deposition of Shawn Makanvand, Oct. 6, 2007, pp. 1, 65–68, 73–74, 80–83, 85–90, 105; Exhibit C of Declaration of Edward E. Casto, Jr. in Support of Defendants' Opposition to Plaintiff's Motion to Dismiss, or Alternatively, for a Preclusion Order, due to Defendants' Spoliation of Evidence.

Excerpts of the Transcript of Videotaped Deposition of Robert Anselmo, Jul. 17, 2007, pp. 1, 23–25, 49–50, 52–53, 56, 60–61, 110, 112–113, 120–122, 284–285, 382; Exhibit D of Declaration of Edward E. Casto, Jr. in Support of Defendants' Opposition to Plaintiff's Motion to Dismiss, or Alternatively, for a Preclusion Order, due to Defendants' Spoliation of Evidence.

Excerpts of the Transcript of Videotaped Deposition of Majid Amini, Jul. 18, 2007, pp. 1, 35, 51, Exhibit E of Declaration of Edward E. Casto, Jr. in Support of Defendants' Opposition to Plaintiff's Motion to Dismiss, or Alternatively, for a Preclusion Order, due to Defendants' Spoliation of Evidence.

Excerpts of the Transcript of Videotaped Deposition of Louis S. Leopold, Jun. 5, 2007, pp. 1, 69–70, 72–73, 75–76, 78–79, 82; Exhibit F of Declaration of Edward E. Casto, Jr. in Support of Defendants' Opposition to Plaintiff's Motion to Dismiss, or Alternatively, for a Preclusion Order, due to Defendants' Spoliation of Evidence.

Excerpts of the Transcript of Videotaped Deposition of David Christopher Hooper, *Cognex Corporation*, Plaintiff, v. *VCode Holdings, Inc., et al.*, Defendants; Jul. 14, 2007; pp. 1, 51–55, 98–99, 102, 105, 116–117, 131–133, 137–138, 142; Exhibit G of Declaration of Edward E. Casto, Jr. in Support of Defendants' Opposition to Plaintiff's Motion to Dismiss, or Alternatively, for a Preclusion Order, due to Defendants' Spoliation of Evidence.

Excerpts of the Transcript of Videotaped Deposition of Patrick Dalton, Jun. 4, 2007, pp. 1, 93–94, 214–215; Exhibit H of Declaration of Edward E. Casto, Jr. in Support of Defendants' Opposition to Plaintiff's Motion to Dismiss, or Alternatively, for a Preclusion Order, due to Defendants' Spoliation of Evidence.

Affidavit of S. Jamal Faleel to Defendants' Opposition to Plaintiff's Motion to Dismiss, or Alternatively, for a Preclusion Order, due to Defendants' Spoliation of Evidence; *Cognex Corporation*, Plaintiff, v. *VCode Holdings, Inc., VData LLC, Acacia Research Corporation, and Veritec Inc.*, Defendants; Nov. 19, 2007.

Defendants' Corrected Opposition to Plaintiff's Motion for Partial Summary Judgment on Count II of Its First Supplemental Complaint/Invalidity in the *Cognex* v. *VCode* litigation; *Cognex Corporation*, Plaintiff, v. *VCode Holdings, Inc., VData LLC, Acacia Research Corporation, and Veritec Inc.*, Defendants; dated Nov. 20, 2007.

Declaration of Val Dieuliis in Support of Defendants' Opposition to Plaintiff's Motions for Partial Summary Judgment; *Cognex Corporation*, Plaintiff, v. *VCode Holdings, Inc., VData LLC, Acacia Research Corporation, and Veritec Inc.*, Defendants; dated Nov. 14, 2007.

Declaration of Steven W. Hartsell in Support of Defendants' Opposition to Plaintiff's Motion for Partial Summary Judgment on Count II of Its First Supplemental Complaint/Invalidity in the *Cognex* v. *VCode* litigation; *Cognex Corporation*, Plaintiff, v. *VCode Holdings, Inc., VData LLC, Acacia Research Corporation, and Veritec Inc.*, Defendants; dated Nov. 15, 2007.

Excerpts from the deposition of Patrick Dalton taken on Jun. 4, 2007, pp. 1, 15, 102–105, 134–135, 162, 172–173, 179–181, 191, 193–194, 196, 204–205, 210, 213, 218–219, 223; Exhibit 1 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Excerpts from the deposition of David Hooper taken on Jul. 14, 2007, pp. 1, 48–50, 53–54, 60, 73, 99–100, 121, 127, 130–133, 140–142; Exhibit 2 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Remarks in Response to Office Action, May 1, 1995, p. 6–8; Exhibit 4 of Declaration of Nov. 15, 2007 Steven W. Hartsell in support of Defendants' Motion for Partial Summary Judgment on Count II of its First Supplemental Complaint/Invalidity in the *Cognex* v. *VCode* litigation.

Markman Order entered by the Court on Oct. 9, 2007, pp. 1–17; Exhibit 5 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Excerpts of the deposition of Robert Anselmo taken on Jul. 17, 2007 which was continued on Sep. 11, 2007, pp. 1, 60–61, 70–71, 109–112, 125, 146–147, 171–172, 176–177, 201–202, 215–216, 293, 296, 353, 284–285, 382; Exhibit 6 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Excerpts of the deposition of Carl Anselmo taken on Jul. 28, 2007, pp. 1, 135–136, 273, 280, 301; Exhibit 7 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Excerpts of the deposition of Louis Leopold taken on Jun. 5, 2007, pp. 1, 9–10, 54–55, 64, 69, 82; Exhibit 8 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Excerpts of the deposition of Shawn Makanvand taken on Oct. 6, 2007, pp. 1, 13, 17, 21–22, 25–28, 73, 80–82, 85–91, 105; Exhibit 9 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Source code written by David Hooper which was appended to the '078 patent, the parent of the '524 patent, and incorporated by reference in the specification of the '524 patent, 11 pages; Exhibit 10 of Declaration of Nov. 15, 2007 Steven W. Hartsell in support of Defendants' Motion for Partial Summary Judgment on Count II of its First Supplemental Complaint/Invalidity in the *Cognex* v. *VCode* litigation.

Portable Scanner Specification; dated Feb. 17, 1986, pp. 1–14; Exhibit 13 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Brochures for Visicheck, Covert, Vericode; Exhibit 17 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation; Exhibit 29 of Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Portions of the prosecution history of the '524 patent; Exhibit 20 of Nov. 15, 2007 Declaration of Steven W. Hartsell in support of Defendants' Motion for Partial Summary Judgment on Count II of its First Supplemental Complaint/ Invalidity in the *Cognex* v. *VCode* litigation.

Declaration of Robert Sant'Anselmo in Reexamination Control No. 90/007,980 for Identification Symbol, System and Method; Jun. 5, 2006, pp. 1–7; Exhibit 22 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Shoemaker, Three Dimensional Graphics with the iAPX 86/20 Numeric Data Processor, Jul./Aug. 1982 Solutions, pp. 6–11; Exhibit 23 of Nov. 15, 2007 Declaration of Steven W. Hartsell in support of Defendants' Motion for Partial Summary Judgment on Count II of its First Supplemental Complaint/Invalidity in the *Cognex* v. *VCode* litigation.

Defendants' Opposition to Plaintiff's Motion for Partial Summary Judgment on Count III of Its First Supplemental Complaint/ Unenforceability in the *Cognex* v. *VCode* litigation; *Cognex Corporation*, Plaintiff, v. *VCode Holdings, Inc., VData LLC, Acacia Research Corporation, and Veritec Inc.*, Defendants; dated Nov. 19, 2007.

Declaration of Edward E. Casto, Jr. in Support of Defendants' Opposition to Plaintiff's Motion for Partial Summary Judgment on Count III of Its First Supplemental Complaint/ Unenforceability in the *Cognex* v. *VCode* litigation; *Cognex Corporation*, Plaintiff, v. *VCode Holdings, Inc., VData LLC, Acacia Research Corporation, and Veritec Inc.*, Defendants; dated Nov. 14, 2007.

Order, *Cognex Corporation* v. *VCode Holdings Inc., VData LLC, Acacia Research Corporation d/b/a Acacia Technologies Group, TechSearch LLC, and Veritec Inc.*, Civ. No. 06–1040(JNE/JJG) Oct. 24, 2006; Exhibit 1 of Nov. 14, 2007 Declaration of Edward E. Casto in support of Defendants' Opposition to Plaintiff's Motion for Partial Summary Judgment on Count III of its First Supplemental Complaint/ Unenforceability in the *Cognex* v. *VCode* litigation.

Order, *Cognex Corporation* v. *VCode Holdings, Inc., VData LLC, Acacia Research Corporation d/b/a Acacia Technologies Group, TechSearch LLC, and Veritec Inc.*, Dec. 11, 2006; Exhibit 2 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

File History of U.S. Appl. No. 07/125,616, Pat. No. 4,924,078, Identification Symbol, System and Method to Carl Sant'Anselmo et al; Exhibit 3 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Request Form for Filing a Patent Application Under 37 CFR 1.62 for U.S. Appl. No. 08/412,091, Mar. 27, 1995; Exhibit 5 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Preliminary Amendment for U.S. Appl. No. 08/412,091, May 1, 1995; Exhibit 7 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Amendment for U.S. Appl. No. 08/412,091, Nov. 16, 1995; Exhibit 8 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Information Disclosure Statement (IDS) for U.S. Appl. No. 08/412,091, Nov. 16, 1995, with listed documents from *Veritec, Inc.* v. *International Data Matrix, Inc*; Exhibit 9 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Notice of Allowability for U.S. Appl. No. 08/412,091, Jan. 25, 1996; Exhibit 10 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Letter to Examiner for U.S. Appl. No. 08/412,091, Feb. 5, 1996; Exhibit 11 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Communication for U.S. Appl. No. 08/412,091, re: IDS of Nov. 17, 1995 considered and entered but not printed on patent, May 1, 1996; Exhibit 12 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Excerpts of the Videotaped Deposition of Patrick Dalton, Jun. 4, 2007 pp. 1, 15, 69–70, 162, 179–181, 190–191, 210–213, 224–225; Exhibit 16 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Excerpts of the Videotaped Deposition of David Christopher Hooper, *Cognex Corporation*, Plaintiff, v. *VCode Holdings, Inc., et al.*, Defendants; Jul. 14, 2007, pp. 1, 99–100, 130–133; pp. 1, 21–22; Exhibit 17 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Excerpts of the Videotaped Deposition of Robert Anselmo, Jul. 17, 2007, pp. 1, 23–25, 44, 47–48, 70–71, 118, 123, 146, –147, 233, 284–285; Exhibit 18 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Excerpts of the Videotaped Deposition of Carl S. Anselmo, Jul. 28, 2007, pp. 1, 260–261, 265–266, 273, 301; Exhibit 19 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Excerpts of the Videotaped Deposition of Louis S. Leopold, Jun. 5, 2007; pp. 1, 9–10, 69, 82; Exhibit 20 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Excerpts of the Deposition of Shawn Makanvand, Oct. 6, 2007, pp. 1, 13, 17, 80–82, 85–86, 90, 105; Exhibit 22 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Patents and Federal Circuit §12.5 Fraudulent Procurement and Inequitable Conduct, pp. 748–752; Exhibit 23 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Expert Report of R. Carl Moy, Sep. 28, 2007, pp. 1–16; Exhibit 25 of Nov. 14, 2007 Declaration of Edward E. Casto in support of Defendants' Opposition to Plaintiff's Motion for Partial Summary Judgment on Count III of its First Supplemental Complaint/Unenforceability in the *Cognex* v. *VCode* litigation.

Declaration of N. Elton Dry Supporting Defendants' Oppositions to Plaintiff's Motions for Summary Judgment; 79 pages; *Cognex Corporation*, Plaintiff, v. *VCode Holdings, Inc., VData LLC, Acacia Research Corporation, and Veritec Inc.*, Defendants; Nov. 12, 2007.

Expert Report of N. Elton Dry, Sep. 26, 2007, 11 pages; Exhibit A–1 of Declaration of N. Elton Dry.

Rebuttal Expert Report of N. Elton Dry, Oct. 31, 2007, 15 pages; Exhibit B of Declaration of N. Elton Dry.

Veritec Press Release in IACC Bulletin, Technology Corner (1 page), Jul. 3, 1985.

Veritec Inc. Preliminary Prospectus; Jul. 5, 1985; pp. 1–23; F–1–F–12.

Veritec Inc., Form 10–K Annual report pursuant to section 13 or 15(d) of the Securities Exchange Act of 1934 for the Fiscal Year ended Jun. 30, 1987, Veritec Inc., Sep. 17, 1987, pp. 1–31, F–1–F–14, 32.

Opening Expert Report of David C. Allais, PhD. Regarding U.S. Patent No. 5,612,524, *Cognex* v. *VCode* litigation; Sep. 28, 2007; pp. 1–48.

Savir et al; The characteristics and decodability of the Universal Product Code symbol; IBM Systems Journal, vol. 14, No. 1; 1975; pp. 16–34; Exhibit 3 of Sep. 28, 2007 Opening Expert Report of David C. Allais in the *Cognex* v. *VCode* litigation.

Chart of Asserted Claims in U.S. Patent 5,612,524 Compared With Offers for Sale and Information Prior to the Critical Date (4 pages); Exhibit 4 of Sep. 28, 2007 Opening Expert Report of David C. Allais in the *Cognex* v. *VCode* litigation.

Anticipation of the Asserted Claims of U.S. Patent 5,612,524 Based on Veritec Brochure, pp. 1–6; Exhibit 5 of Sep. 28, 2007 Opening Expert Report of David C. Allais in the *Cognex* v. *VCode* litigation.

Anticipation of the Asserted Claims of U.S. Patent 5,612,524 Based on Newsweek Article (Apr. 21, 1986); pp. 1–6; Exhibit 6 of Sep. 28, 2007 Opening Expert Report of David C. Allais in the *Cognex* v. *VCode* litigation.

Anticipation of the Asserted Claims of U.S. Patent 5,612,524 Based on Automatic I.D. News Article (Oct. 1986); pp. 1–5; Exhibit 7 of Sep. 28, 2007 Opening Expert Report of David C. Allais in the *Cognex* v. *VCode* litigation.

Anticipation of the Asserted Claims of U.S. Patent 5,612,524 Based on the Dalton Paper (Oct. 1986); pp. 1–6; Exhibit 8 of Sep. 28, 2007 Opening Expert Report of David C. Allais in the *Cognex* v. *VCode* litigation.

Anticipation of the Asserted Claims of U.S. Patent 5,612,524 Based on Japanese Published Application JP027,074 [1983]; pp. 1–7; Exhibit 9 of Sep. 28, 2007 Opening Expert Report of David C. Allais in the *Cognex* v. *VCode* litigation.

Anticipation of the Asserted Claims of Patent No. 5,612,524 Based on Japanese Published Application JP 065,375 [1986]; pp. 1–6; Exhibit 10 of Sep. 28 2007 Opening Expert Report of David C. Allais in the *Cognex* v. *VCode* litigation.

Anticipation of the Asserted Claims of U.S. Patent 5,612,524 Based on U.S. Patent No. 3,847,346 to Dolch; pp. 1–7; Exhibit 11 of Sep. 28, 2007 Opening Expert Report of David C. Allais in the *Cognex* v. *VCode* litigation.

Anticipation of the Asserted Claims of U.S. Patent 5,612,524 Based on U.S. Patent No. 3,633,993 ("Acker"); pp. 1–7; Exhibit 12 of Sep. 28, 2007 Opening Expert of David C. Allais in the *Cognex* v. *VCode* litigation.

Anticipation of the Asserted Claims of U.S. Patent 5,612,524 Based on U.S. Patent No. 4,424,587 to Wevelsiep et al. pp. 1–7; Exhibit 13 of Sep. 28, 2007 Opening Expert Report of David C. Allais in the *Cognex* v. *VCode* litigation.

Anticipation of the Asserted Claims of United States Patent 5,612,524 Based on U.S. Patent No. 3, 632,995 (Wilson) pp. 1–7; Exhibit 14 of Sep. 28, 2007 Opening Expert Report of David C. Allais in the *Cognex* v. *VCode* litigation.

Anticipation of the Asserted Claims of U.S. Patent 5,612,524 Based on U.S. Patent No. 4,007,377 ("Simon") pp. 1–6; Exhibit 15 of Sep. 28, 2007 Opening Expert Report of David C. Allais in the *Cognex* v. *VCode* litigation.

Videotaped Deposition of J. Randall Beckers, *Cognex* v. *VCode* litigation; Jul. 24, 2007; pp. 1–202 (52 sheets).

Defendant Stamps.com, Inc.'s Motion for Summary Judgment on the Ground that U.S. Patent No. 5,612,524 is Unenforceable in *VCode Holdings Inc. et al.* v. *Adidas America, Inc. et al.*, Case No. 04–4583 (JMR/FLN), USDC District of Minnesota, Mar. 3, 2006, pp. 1–2; identified in Exhibit B entitled "Materials Reviewed" of Expert Report of R. Carl Moy in the *Cognex* v. *VCode* litigation; Sep. 28, 2007.

Defendant Stamps.com, Inc.'s Notice of Motion for Summary Judgment on the Ground that U.S. Patent No. 5,612,524 is Unenforceable in the *VCode* v. *Adidas* litigation, Mar. 3, 2006, pp. 1–2; identified in Exhibit B entitled "Materials Reviewed" of Expert Report of R. Carl Moy in the *Cognex* v. *VCode* litigation; Sep. 28, 2007.

Memorandum in Support of Stamps.com Inc.'s Motion for Summary Judgment on the Ground that U.S. Patent No. 5,612,524 is Unenforceable in the *VCode* v. *Adidas* litigation, Mar. 3, 2006, 38 pages; identified in Exhibit B entitled "Materials Reviewed" of Expert Report of R. Carl Moy in the *Cognex* v. *VCode* litigation; Sep. 28, 2007.

Affidavit of Mark MacDonald in Support of Stamps.com Inc.'s Separately Filed Motion for Summary Judgment re: Invalidity and Motion for Summary Judgment re: Unenforceability in the *VCode* v. *Adidas* litigation, Mar. 2, 2006, pp. 1–2; identified in Exhibit B entitled "Material Reviewed" of Expert Report of R. Carlos Moy in the *Cognex* v. *VCode* litigation; Sep. 28, 2007.

Affidavit of Paul J. Tanck in Support of Stamps.com Inc.'s Separately Filed Motion for Summary Judgment re: Invalidity and Motion for Summary Judgment re: Unenforceability in the *VCode* v. *Adidas* litigation, Mar. 2, 2006 pp. 1–2; identified in Exhibit B entitled "Materials Reviewed" of Expert Report of R. Carl Moy in the *Cognex* v. *VCode* litigation; Sep. 28, 2007.

Affidavit of Philip J. Graves, Esq. in Support of Stamps.com Inc.'s Separately Filed Motion for Summary Judgment re: Invalidity and Motion for Summary Judgment re: Unenforceability in the *VCode* v. *Adidas* litigation, Mar. 2, 2006, pp. 1–7; identified in Exhibit B entitled "Materials Reviewed" of Expert Report of R. Carl Moy in the *Cognex* v. *VCode* litigation; Sep. 28, 2007.

Index to Exhibits in Support of Stamps.com Inc.'s Separately Filed Motion for Summary Judgment re: Invalidity and Motion for Summary Judgment re: Unenforceability in the *VCode* v. *Adidas* litigation, Mar. 3, 2006, pp. 1–6; identified in Exhibit B entitled "Materials Reviewed" of Expert Report of R. Carl Moy in the *Cognex* v. *VCode* litigation; Sep. 28, 2007.

Defendant's Answer, Affirmative Defenses, and Counterclaim to Plaintiff's First Supplemental Complaint in the *Cognex* v. *VCode* litigation, Dec. 27, 2006, pp. 1–15.

Complaint for Declaratory Judgment With Jury Demand in the *Cognex* v. *VCode* litigation, Mar. 13, 2006, pp. 1–15.

Declaration of Stanley E. Sclaroff, Ph.D. in the *Cognex* v. *VCode* litigation, Sep. 28, 2007, 16 pages.

Plaintiff's First Supplemental Complaint With Jury Demand in the *Cognex* v. *VCode* litigation, pp. 1–20; Dec. 12, 2006.

Cognex Corporation's Non–Infringement Claim Charts in the *Cognex* v. *VCode* litigation, 4 pages, Mar. 23, 2006.

U.S. Patent 5,612,524 and Claims Asserted by VCode and VData; 4 pages; Exhibit A of Mar. 23, 2007 Cognex Corporation's Non–Infringement Claim Charts.

U.S. Patent 5,612,524 and Claims Asserted by VCode and VData to be Indirectly Infringed; 4 pages; Exhibit B of Mar. 23, 2007 Cognex Corporation's Non–Infringement Claim Charts.

Representative Differences Between the Algorithms Used By the Cognex Symbol Reader Products and Those Disclosed in the '524 Patent for Image Acquisition and Data Capture; 2 pages; Exhibit C of Mar. 23, 2007 Cognex Corporation's Non–Infringement Claim Charts.

Defendant Acacia Reseach Corporation's Response to Plaintiffs' First Set of Requests for Admission [1–6] in the *Cognex* v. *VCode* litigation; Aug. 3, 2007, pp. 1–6.

Defendant Veritec Inc.'s Response to Plaintiff's First Set of Requests for Admission [1–89] in the *Cognex* v. *VCode* litigation, Aug. 3, 2007, pp. 1–39.

Defendants' Answer, Affirmative Defenses, and Counterclaim to Plaintiff's First Supplemental Complaint in the *Cognex* v. *VCode* litigation, Dec. 27, 2006, pp. 1–15.

Defendants' Infringement Claim Charts in the *Cognex* v. *VCode* litigation, Feb. 26, 2007, pp. 1–12.

Defendants' Supplemental Infringement Claim Charts in the *Cognex* v. *VCode* litigation, Jul. 3, 2007, pp. 1–18.

Defendants' Answers and Objections to Plaintiff's First Set of Interrogatories [1–13] in the *Cognex* v. *VCode* litigation, Jan. 5, 2007, pp. 1–25.

Defendants' Answers and Objections to Plaintiff's Second Set of Interrogatories [14–17] in the *Cognex* v. *VCode* litigation, Aug. 3, 2007, pp. 1–9.

Defendants' Second Supplemental Infringement Claim Charts in the *Cognex* v. *VCode* litigation, Jul. 30, 2007, pp. 1–17.

Haroney; Graphing Quadric Surfaces; Byte, Dec. 1986, 8 pages.

The Veritec Story: Visicheck Identification System Covert Identification System and Vericode Identification System; Esquire Reporting Compahy Inc.; pp. 1–14; identified in Exhibit 2 entitled "Materials Considered" of Opening Expert Report of David C. Allais, PhD. Regarding U.S. Patent No. 5,612,524, *Cognex* v. *VCode* litigation; Sep. 28, 2007.

Letter from Patrick L. Dalton, Veritec, to Isaac Hooper, Intel Corporation; Oct. 31, 1986; 1 page.

Letter from Patrick L. Dalton, Veritec, to John Korzun, Squibb Corporation; Jul. 15, 1986; 1 page.

Letter from Patrick L. Dalton, Veritec, to Charles Crawford, Intel, Jun. 30, 1986, 2 pages.

Letter from Patrick L. Dalton, Veritec, to Scott Holden, Intel Corporation; Jul. 22, 1986; 3 pages.

Letter from Patrick L. Dalton, Veritec, to Randy McDowell, Intel Corporation, Aug. 4, 1986; 2 pages.

Letter from Patrick L. Dalton, Veritec, to Jim Greed, Semiconductor Equipment Group General Signal Corporation; Nov. 18, 1986; 3 pages.

Collection of Vericodes and program instructions (3 pages); identified in Exhibit 2 entitled "Materials Considered" of Opening Expert Report of David C. Allais, PhD. Regarding U.S. Patent No. 5,612,524, *Cognex* v. *VCode* litigation; Sep. 28, 2007.

Specification for "Symbol Reader" (pp. 1–14), Statement Under 37 C.F.R. § 1.56, Nov. 23, 1987 (1 page), and IDS Form PTO–1449; (pp. 1–3).

Veritec Taught Priddy Learned (3 pages); identified in Exhibit 2 entitled "Materials Considered" of Opening Expert Report of David C. Allais, PhD. Regarding U.S. Patent 5,612,524, *Cognex* v. *VCode* litigation; Sep. 28, 2007.

Veriscan Programming code (158 pages) (1987).

Shoemaker, Ken; "Three Dimensional Graphics with the iAPX 86/20 Numeric Data Processor," Solutions, Jul./Aug. 1982 (pp. 6–11).

Allais, David C.; Bar Code Symbology: Some Observations on Theory and Practice; Feb. 16, 1982 (43 sheets).

Exhibit 2, Vericode Brochure: Brochure advertising the "Vericode Identification System,"published before or during Jul. 1986.

Exhibit 3, Dalton Paper: Patrick Dalton, *Technologies for Security Environments*, published in Conference Proceedings, Scan–Tech '86 Conference, Oct. 15–17, 1986.

Exhibit 4, Automatic I.D. News Article: B. Cockel, "□: When Bar Coding Can't Fit the Real Estate," published in *Automatic I.D. News*, Oct. 1986.

Exhibit 5, Newsweek Article: J. Jedamus, "Cracking Down on Counterfeits," published in *Newsweek*, Apr. 21, 1986.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 9–12 and 15–19 is confirmed.

Claims 1–8, 13–14 and 20 are cancelled.

* * * * *